(12) United States Patent
Sugishita et al.

(10) Patent No.: US 7,835,019 B2
(45) Date of Patent: Nov. 16, 2010

(54) IMAGE FORMING APPARATUS AND AUTHENTICATION AND CHARGING METHOD

(75) Inventors: Satoru Sugishita, Tokyo (JP); Junji Ukegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1094 days.

(21) Appl. No.: 11/137,759

(22) Filed: May 26, 2005

(65) Prior Publication Data

US 2005/0268104 A1 Dec. 1, 2005

(30) Foreign Application Priority Data

May 26, 2004 (JP) .............................. 2004-156239

(51) Int. Cl.
*G06K 15/00* (2006.01)
*G06F 3/12* (2006.01)
(52) U.S. Cl. .................. 358/1.14; 358/1.1; 358/1.15
(58) Field of Classification Search .................. 358/1.1, 358/1.9, 1.11–1.18; 710/15–16; 726/16, 726/27; 713/193, 176
See application file for complete search history.

(56) References Cited

U.S. PATENT DOCUMENTS

| | | | |
|---|---|---|---|
| 6,631,397 B1 | 10/2003 | Satomi et al. | |
| 2003/0067629 A1 | 4/2003 | Sugishita | |
| 2004/0021890 A1 | 2/2004 | Hirai et al. | |
| 2004/0049684 A1 | 3/2004 | Nomura et al. | |
| 2004/0057066 A1 | 3/2004 | Sugishita et al. | |
| 2004/0095602 A1 | 5/2004 | Sugishita et al. | |
| 2004/0128532 A1 | 7/2004 | Ohishi et al. | |
| 2004/0145766 A1 | 7/2004 | Sugishita et al. | |
| 2005/0007619 A1* | 1/2005 | Minato ...................... | 358/1.14 |

FOREIGN PATENT DOCUMENTS

| | | |
|---|---|---|
| EP | 1 398 954 A2 | 3/2004 |
| EP | 1398954 A2 * | 3/2004 |
| JP | 2004-122778 | 4/2004 |

OTHER PUBLICATIONS

U.S. Appl. No. 11/828,051, filed Jul. 25, 2007, Sugishita.
U.S. Appl. No. 11/500,955, filed Aug. 9, 2006, Sugishita.

* cited by examiner

*Primary Examiner*—Thierry L Pham
(74) *Attorney, Agent, or Firm*—Oblon, Spivak, McClelland, Maier & Neustadt, L.L.P.

(57) ABSTRACT

An image forming apparatus having a hardware resource used in image forming processing and an application executing the image forming processing, and performing authentication relating to the execution of the image forming processing is disclosed. The image forming apparatus includes a character string display part and a type character string display part. The character string display part displays a character string that does not include the type of the image forming processing, and prompts the authentication. The type character string display part displays the type of the image forming processing.

26 Claims, 29 Drawing Sheets

FIG.10

| AUTHENTICATION METHOD | REMARKS |
|---|---|
| KEY COUNTER | CHARGING |
| KEY COUNTER | CHARGING |
| KEY COUNTER | NO CHARGING |
| ADDITION-TYPE KEY CARD AUTHENTICATION | |
| SUBTRACTION-TYPE KEY CARD AUTHENTICATION | |
| PREPAID CARD AUTHENTICATION | |
| COIN RACK AUTHENTICATION | |
| MK1 KEY CARD AUTHENTICATION | |
| FACE-TO-FACE-SELLING CHARGING DEVICE | AUTHENTICATION WITH COIN RACK AND KEY COUNTER |
| FACE-TO-FACE-SELLING CHARGING DEVICE | AUTHENTICATION WITH ONLY COIN RACK |
| BARCODE PRINTER AUTHENTICATION | |
| NETWORK CHARGING AUTHENTICATION | |
| ADDITION-TYPE OVERSEAS KEY CARD AUTHENTICATION | |
| SUBTRACTION-TYPE OVERSEAS KEY CARD AUTHENTICATION | |
| USER CODE | PERMANENT AUTHENTICATION |
| USER CODE | TEMPORARY AUTHENTICATION |
| USER CODE | AUTOMATIC REGISTRATION OF USER IN ABSENCE OF SPECIFIED USER |
| USER CODE | GENERAL AUTHENTICATION WITH USER CODE AFTER ADMINISTRATOR AUTHENTICATION WITH LOCAL ADDRESS BOOK |
| USER CODE | GENERATION OF PARAMETER ERROR IF USER IS NOT SPECIFIED |
| EXTENDED USER CODE | PERMANENT AUTHENTICATION |
| EXTENDED USER CODE | TEMPORARY AUTHENTICATION |
| EXTENDED USER CODE | GENERAL AUTHENTICATION WITH USER CODE AFTER ADMINISTRATOR AUTHENTICATION WITH LOCAL ADDRESS BOOK |
| EXTENDED USER CODE | GENERATION OF PARAMETER ERROR IF USER IS NOT SPECIFIED |
| LOCAL ADDRESS BOOK AUTHENTICATION | PERMANENT AUTHENTICATION |
| LOCAL ADDRESS BOOK AUTHENTICATION | TEMPORARY AUTHENTICATION |
| LOCAL ADDRESS BOOK AUTHENTICATION | AUTHENTICATED ONLY WHEN BEING ADMINISTRATOR |
| LOCAL ADDRESS BOOK AUTHENTICATION | AUTHENTICATED ONLY WHEN BEING GENERAL USER |
| LOCAL ADDRESS BOOK AUTHENTICATION | AUTHENTICATED AS GUEST USER IF NOT ADMINISTRATOR |
| LOCAL ADDRESS BOOK AUTHENTICATION | GENERATION OF PARAMETER ERROR IF USERNAME IS NOT SPECIFIED |
| NT AUTHENTICATION | PERMANENT AUTHENTICATION |
| NT AUTHENTICATION | TEMPORARY AUTHENTICATION |
| NT AUTHENTICATION | AUTHENTICATED ONLY WHEN BEING ADMINISTRATOR |
| NT AUTHENTICATION | AUTHENTICATED ONLY WHEN BEING GENERAL USER |
| NT AUTHENTICATION | AUTHENTICATED AS GUEST USER IF NOT ADMINISTRATOR |
| NT AUTHENTICATION | GENERATION OF PARAMETER ERROR IF USERNAME IS NOT SPECIFIED |
| LDAP AUTHENTICATION | PERMANENT AUTHENTICATION |
| LDAP AUTHENTICATION | TEMPORARY AUTHENTICATION |
| LDAP AUTHENTICATION | AUTHENTICATED ONLY WHEN BEING ADMINISTRATOR |
| LDAP AUTHENTICATION | AUTHENTICATED ONLY WHEN BEING GENERAL USER |
| LDAP AUTHENTICATION | AUTHENTICATED AS GUEST USER IF NOT ADMINISTRATOR |
| LDAP AUTHENTICATION | GENERATION OF PARAMETER ERROR IF USERNAME IS NOT SPECIFIED |

FIG.11

| AUTHENTICATION METHOD | REMARKS |
|---|---|
| USER CODE | PERMANENT AUTHENTICATION |
| USER CODE | TEMPORARY AUTHENTICATION |
| USER CODE | AUTOMATIC REGISTRATION OF USER IN ABSENCE OF SPECIFIED USER |
| USER CODE | GENERAL AUTHENTICATION WITH USER CODE AFTER ADMINISTRATOR AUTHENTICATION WITH LOCAL ADDRESS BOOK |
| USER CODE | GENERATION OF PARAMETER ERROR IF USER IS NOT SPECIFIED |
| LOCAL ADDRESS BOOK AUTHENTICATION | PERMANENT AUTHENTICATION |
| LOCAL ADDRESS BOOK AUTHENTICATION | TEMPORARY AUTHENTICATION |
| LOCAL ADDRESS BOOK AUTHENTICATION | AUTHENTICATED ONLY WHEN BEING ADMINISTRATOR |
| LOCAL ADDRESS BOOK AUTHENTICATION | AUTHENTICATED ONLY WHEN BEING GENERAL USER |
| LOCAL ADDRESS BOOK AUTHENTICATION | AUTHENTICATED AS GUEST USER IF NOT ADMINISTRATOR |
| LOCAL ADDRESS BOOK AUTHENTICATION | GENERATION OF PARAMETER ERROR IF USERNAME IS NOT SPECIFIED |
| NT AUTHENTICATION | PERMANENT AUTHENTICATION |
| NT AUTHENTICATION | TEMPORARY AUTHENTICATION |
| NT AUTHENTICATION | AUTHENTICATED ONLY WHEN BEING ADMINISTRATOR |
| NT AUTHENTICATION | AUTHENTICATED ONLY WHEN BEING GENERAL USER |
| NT AUTHENTICATION | AUTHENTICATED AS GUEST USER IF NOT ADMINISTRATOR |
| NT AUTHENTICATION | GENERATION OF PARAMETER ERROR IF USERNAME IS NOT SPECIFIED |
| LDAP AUTHENTICATION | PERMANENT AUTHENTICATION |
| LDAP AUTHENTICATION | TEMPORARY AUTHENTICATION |
| LDAP AUTHENTICATION | AUTHENTICATED ONLY WHEN BEING ADMINISTRATOR |
| LDAP AUTHENTICATION | AUTHENTICATED ONLY WHEN BEING GENERAL USER |
| LDAP AUTHENTICATION | AUTHENTICATED AS GUEST USER IF NOT ADMINISTRATOR |
| LDAP AUTHENTICATION | GENERATION OF PARAMETER ERROR IF USERNAME IS NOT SPECIFIED |

FIG.12

| AUTHENTICATION METHOD | REMARKS |
|---|---|
| KEY COUNTER | CHARGING |
| KEY COUNTER | NO CHARGING |
| ADDITION-TYPE KEY CARD AUTHENTICATION | |
| SUBTRACTION-TYPE KEY CARD AUTHENTICATION | |
| PREPAID CARD AUTHENTICATION | |
| COIN RACK AUTHENTICATION | |
| NETWORK CHARGING AUTHENTICATION | |
| ADDITION-TYPE OVERSEAS KEY CARD AUTHENTICATION | |
| SUBTRACTION-TYPE OVERSEAS KEY CARD AUTHENTICATION | |

FIG.13

| FUNCTION REQUIRING AUTHENTICATION | AUTHENTICATION METHOD |
|---|---|
| FULL-COLOR PRINTING | AUTHENTICATION METHOD 1 OR AUTHENTICATION METHOD 2 |
| TWO-COLOR PRINTING | AUTHENTICATION METHOD 1 |
| SINGLE-COLOR PRINTING | AUTHENTICATION METHOD 3 OR AUTHENTICATION METHOD 4 |
| MONOCHROME PRINTING | AUTHENTICATION METHOD 3 |

FIG.22

| AUTHENTICATION METHOD TYPE | AUTHENTICATION STATE |
|---|---|
| AUTHENTICATION METHOD 1 | AUTHENTICATED |
| AUTHENTICATION METHOD 2 | NOT AUTHENTICATED |
| AUTHENTICATION METHOD 3 | NOT AUTHENTICATED |
| AUTHENTICATION METHOD 4 | AUTHENTICATED |

FIG.23

| FUNCTION | AUTHENTICATION STATE |
|---|---|
| FULL COLOR | NO SCREEN DISPLAY BECAUSE USER IS AUTHENTICATED WITH AUTHENTICATION METHOD 1 |
| TWO COLOR | NO SCREEN DISPLAY BECAUSE USER IS AUTHENTICATED WITH AUTHENTICATION METHOD 1 |
| SINGLE COLOR | NO SCREEN DISPLAY BECAUSE USER IS AUTHENTICATED WITH AUTHENTICATION METHOD 4 |
| MONOCHROME | DISPLAY OF AUTHENTICATION SCREEN CORRESPONDING TO AUTHENTICATION METHOD 3 IS REQUESTED |

FIG.24

| PERSONAL AUTHENTICATION SETTING | AUTHENTICATION WITH LOCAL ADDRESS BOOK |
|---|---|
| FULL COLOR | KEY CARD |
| MONOCHROME | KEY CARD OR KEY COUNTER |
| TWO COLOR | NO SETTING |
| SINGLE COLOR | NO SETTING |

FIG.25

| FUNCTION OR OPERATION | AUTHENTICATION METHOD |
|---|---|
| FULL COLOR | AUTHENTICATION METHOD 1 |
| MONOCHROME | AUTHENTICATION METHOD 1 OR AUTHENTICATION METHOD 2 |
| TWO COLOR | NONE |
| SINGLE COLOR | NONE |
| PANEL-USING JOB OPERATION | AUTHENTICATION METHOD 3 |
| SETTING OPERATION FOR GENERAL USER | AUTHENTICATION METHOD 3 |
| SETTING OPERATION FOR USER ADMINISTRATOR | AUTHENTICATION METHOD 3 |
| SETTING OPERATION FOR NETWORK ADMINISTRATOR | AUTHENTICATION METHOD 3 |
| SETTING OPERATION FOR DOCUMENT MANAGER | AUTHENTICATION METHOD 3 |
| SETTING OPERATION FOR APPARATUS MANAGER | AUTHENTICATION METHOD 3 |

FIG.26

| AUTHENTICATION METHOD | CONTENTS OF DISPLAY |
|---|---|
| AUTHENTICATION METHOD 1 (KEY CARD) | SET KEY CARD |
| AUTHENTICATION METHOD 2 (KEY COUNTER) | SET KEY COUNTER |
| AUTHENTICATION METHOD 3 (LOGON) | LOGON SCREEN |
| AUTHENTICATION METHOD 4 (USER ADMINISTRATOR LOGON) | USER ADMINISTRATOR LOGON SCREEN |
| AUTHENTICATION METHOD 5 (NETWORK ADMINISTRATOR LOGON) | NETWORK ADMINISTRATOR LOGON SCREEN |
| AUTHENTICATION METHOD 6 (DOCUMENT MANAGER LOGON) | DOCUMENT MANAGER LOGON SCREEN |
| AUTHENTICATION METHOD 7 (APPARATUS MANAGER LOGON) | APPARATUS MANAGER LOGON SCREEN |

FIG.27

| USER ATTRIBUTE | GENERAL |
|---|---|
| COLOR | NO |
| MONOCHROME | YES |
| TWO COLOR | NO |
| SINGLE COLOR | YES |
| COPY APPLICATION EXECUTION AUTHORIZATION | YES |

FIG.28

| FULL COLOR | NO |
|---|---|
| MONOCHROME | YES |
| TWO COLOR | NO |
| SINGLE COLOR | YES |
| COPY APPLICATION FUNCTION | YES |
| GENERAL USER FUNCTION | YES |
| USER ADMINISTRATOR FUNCTION | NO |
| NETWORK ADMINISTRATOR FUNCTION | NO |
| DOCUMENT MANAGER FUNCTION | NO |
| APPARATUS MANAGER FUNCTION | NO |

FIG.29

| FULL COLOR | NON-EXECUTABLE (AUTHENTICATION NG, UNUSABLE) |
|---|---|
| MONOCHROME | NON-EXECUTABLE (AUTHENTICATION NG, USABLE) |
| TWO COLOR | NON-EXECUTABLE (AUTHENTICATION NOT REQUIRED, UNUSABLE) |
| SINGLE COLOR | EXECUTABLE (AUTHENTICATION NOT REQUIRED, USABLE) |
| COPY APPLICATION FUNCTION | EXECUTABLE (AUTHENTICATION OK, USABLE) |
| GENERAL USER FUNCTION | EXECUTABLE (AUTHENTICATION OK, USABLE) |
| USER ADMINISTRATOR FUNCTION | NON-EXECUTABLE (AUTHENTICATION OK, UNUSABLE) |
| NETWORK ADMINISTRATOR FUNCTION | NON-EXECUTABLE (AUTHENTICATION OK, UNUSABLE) |
| DOCUMENT MANAGER FUNCTION | NON-EXECUTABLE (AUTHENTICATION OK, UNUSABLE) |
| APPARATUS MANAGER FUNCTION | NON-EXECUTABLE (AUTHENTICATION OK, UNUSABLE) |

FIG.30

| FUNCTION REQUIRING CHARGING | CHARGING METHOD |
|---|---|
| FULL-COLOR PRINTING | AUTHENTICATION METHOD 1 OR AUTHENTICATION METHOD 2 |
| TWO-COLOR PRINTING | NONE |
| SINGLE-COLOR PRINTING | AUTHENTICATION METHOD 3 |
| MONOCHROME PRINTING | NONE |

| REQUESTOR | CLIENT ID | NECESSARY APPLICATION INFORMATION |
|---|---|---|
| COPY | cid | COPY/DOCUMENT BOX |
| PRINTER | cid | PRINTER |
| SCANNER | cid | SCANNER |

FIG.35A

FOR COPY

| FUNCTION NAME | METHOD NAME (MULTIPLE SPECIFICATIONS ALLOWED) |
|---|---|
| APPLICATION FUNCTION | AUTHENTICATION METHOD 1/ AUTHENTICATION METHOD 2 |
| JOB RESET | AUTHENTICATION METHOD 1 |
| MONOCHROME | NONE |

FIG.35B

FOR PRINTER

| FUNCTION NAME | METHOD NAME (MULTIPLE SPECIFICATIONS ALLOWED) |
|---|---|
| APPLICATION FUNCTION | AUTHENTICATION METHOD 1/ AUTHENTICATION METHOD 2 |
| JOB RESET | AUTHENTICATION METHOD 1 |
| MONOCHROME | NONE |

FIG.36

| | METHOD | REAL DEVICE 1 | REAL DEVICE 2 |
|---|---|---|---|
| ARRAY 0 | AUTHENTICATION METHOD 1 | KEY CARD | NONE |
| ARRAY 1 | AUTHENTICATION METHOD 2 | KEY COUNTER | USER CODE |
| ... | ... | ... | ... |
| ARRAY 30 | AUTHENTICATION METHOD 31 | NONE | NONE |
| ARRAY 31 | AUTHENTICATION METHOD 32 | NONE | NONE |

FIG.37

| REAL DEVICE NAME | CCM NAME | AUTHENTICATION METHOD INFORMATION | STATE |
|---|---|---|---|
| KEY CARD | CCM 1 | AUTHENTICATION METHOD INFORMATION | STATE INFORMATION 1-1 |
| KEY COUNTER | CCM 2 | AUTHENTICATION METHOD INFORMATION | STATE INFORMATION 2-1, STATE INFORMATION 2-2 |
| USER CODE | CCM 3 | AUTHENTICATION METHOD INFORMATION | STATE INFORMATION 3-1 |

IMAGE FORMING APPARATUS AND AUTHENTICATION AND CHARGING METHOD

BACKGROUND OF THE INVENTION

1. Field of the Invention

The present invention relates to an image forming apparatus performing authentication and charging and a method of performing the authentication and charging.

2. Description of the Related Art

In recent years, image forming apparatuses containing the functions of apparatuses such as a facsimile machine, a printer, a copier, and a scanner in a single housing have been known. These image forming apparatuses have a display part, a printing part, an image obtaining part, and four types of applications corresponding to a facsimile machine, a printer, a copier, and a scanner provided in a single housing, and operate as a facsimile machine, a printer, a copier, and a scanner by switching the applications.

The image forming apparatuses having these functions are often used by an unspecified number of users at, for instance, convenience stores. In this case, charging and authentication are required. A description is given, with reference to FIGS. 1 through 3, of three types of screens displayed in such a case. These screens are displayed when a user intends to make a full-color copy.

The screen illustrated in FIG. 1 is displayed when a user code is required for user authentication. As illustrated, a message reading IN CASE OF USING "FULL COLOR," ENTER USER CODE WITH NUMERIC KEYPAD AND PRESS # KEY. CHANGE FOR OTHER COLOR MODES WITH SELECTION KEY. is displayed on this screen.

The screen illustrated in FIG. 2 is displayed when a key counter, key card, or user code is required for user authentication. As illustrated, a message reading IN CASE OF USING "FULL COLOR," SET KEY COUNTER OR KEY CARD, OR ENTER USER CODE WITH NUMERIC KEYPAD AND PRESS # KEY. is displayed on this screen.

The screen illustrated in FIG. 3 is displayed when a key counter or key card and a user code are required for user authentication. As illustrated, a message reading IN CASE OF USING "FULL COLOR," SET KEY COUNTER OR KEY CARD, ENTER USER CODE WITH NUMERIC KEYPAD, AND PRESS # KEY. is displayed on this screen.

A function such as full color and a combination of authentication devices such as a user code and a key counter are embedded in the character strings displayed on the above-described screens. Accordingly, when a new authentication or charging method is added in the case of, for instance, restricting a new function or supporting a new authentication method, it is necessary to re-create the screen, thus increasing man-hours for correction.

SUMMARY OF THE INVENTION

Accordingly, it is a general object of the present invention to provide an image forming apparatus and an authentication and charging method in which the above-described disadvantage is eliminated.

A more specific object of the present invention is to provide an image forming apparatus and an authentication and charging method capable of reducing man-hours for correction in the case of adding a new authentication or charging method.

The above objects of the present invention are achieved by an image forming apparatus having a hardware resource used in image forming processing and an application executing the image forming processing, the image forming apparatus performing authentication relating to the execution of the image forming processing, the image forming apparatus including a character string display part configured to display a character string prompting the authentication, the character string excluding a type of the image forming processing; and a type character string display part configured to display the type of the image forming processing.

The above objects of the present invention are also achieved by an authentication and charging method in an image forming apparatus having a hardware resource used in image forming processing and an application executing the image forming processing, the image forming apparatus performing authentication relating to the execution of the image forming processing, the authentication and charging method including the steps of (a) displaying a character string prompting the authentication, the character string excluding a type of the image forming processing; and (b) displaying the type of the image forming processing.

According to the present invention, an image forming apparatus and an authentication and charging method that are capable of reducing man-hours for correction in the case of adding a new authentication or charging method are provided.

BRIEF DESCRIPTION OF THE DRAWINGS

Other objects, features and advantages of the present invention will become more apparent from the following detailed description when read in conjunction with the accompanying drawings, in which:

FIG. 10 is a table showing examples of independent authentication according to the embodiment of the present invention;

FIGS. 11 and 12 are tables showing examples of combination authentication according to the embodiment of the present invention;

FIG. 13 is a table showing an authentication setting according to the embodiment of the present invention;

FIG. 22 is a table showing the authentication states of various types of authentication according to the embodiment of the present invention;

FIG. 23 is a table showing authentication states required for execution of functions according to the embodiment of the present invention;

FIG. 24 is a table showing a system setting according to the embodiment of the present invention;

FIG. 25 is a table showing functions or operations and authentication methods corresponding thereto according to the embodiment of the present invention;

FIG. 26 is a table showing specific authentication methods according to the embodiment of the present invention;

FIG. 27 is a table showing a user setting according to the embodiment of the present invention;

FIG. 28 is a table showing usable functions according to the embodiment of the present invention;

FIG. 29 is a table showing determination results according to the embodiment of the present invention;

FIG. 30 is a table showing a charging setting according to the embodiment of the present invention;

FIGS. 35A and 35B are diagrams showing authentication and charging setting lists according to the embodiment of the present invention;

FIG. 36 shows a method table according to the embodiment of the present invention;

FIG. 37 is a diagram showing a real device management list according to the embodiment of the present invention;

DETAILED DESCRIPTION OF THE PREFERRED EMBODIMENTS

A description is given, with reference to the accompanying drawings, of an embodiment of the present invention.

In the following description, an authentication and charging device refers collectively to an authentication device and a charging device. When there is no particular need to refer collectively to the authentication device and the charging device, they are referred to separately.

Figure 1:
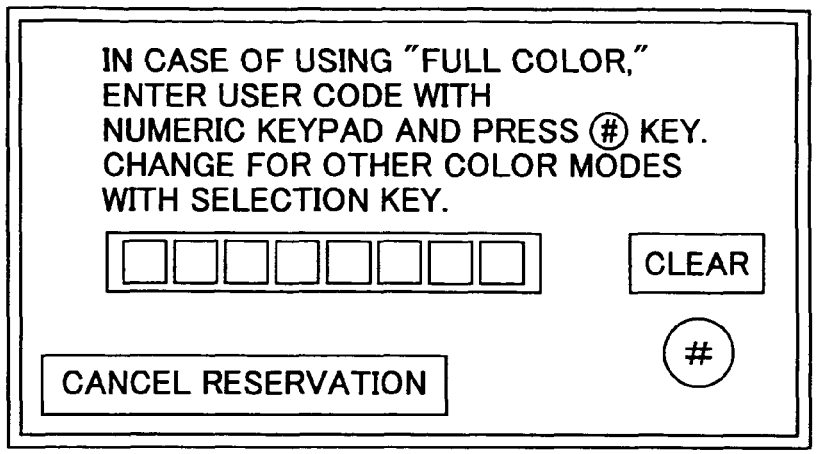
FIG. 1 is a diagram illustrating a conventional screen.
Figure 2:
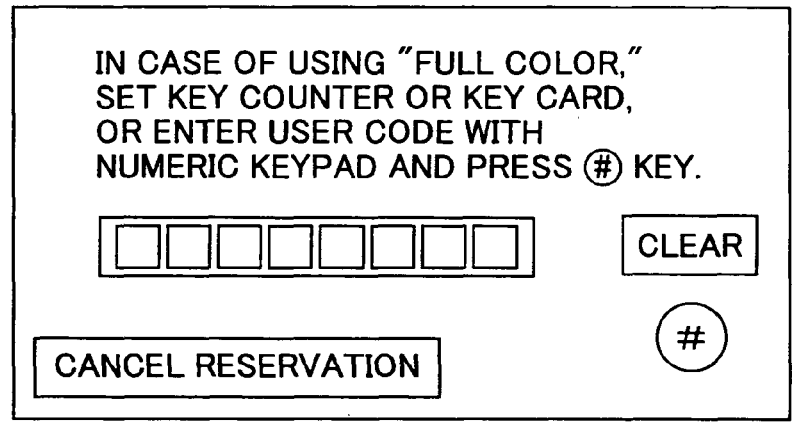
FIG. 2 is a diagram illustrating another conventional screen.
Figure 3:
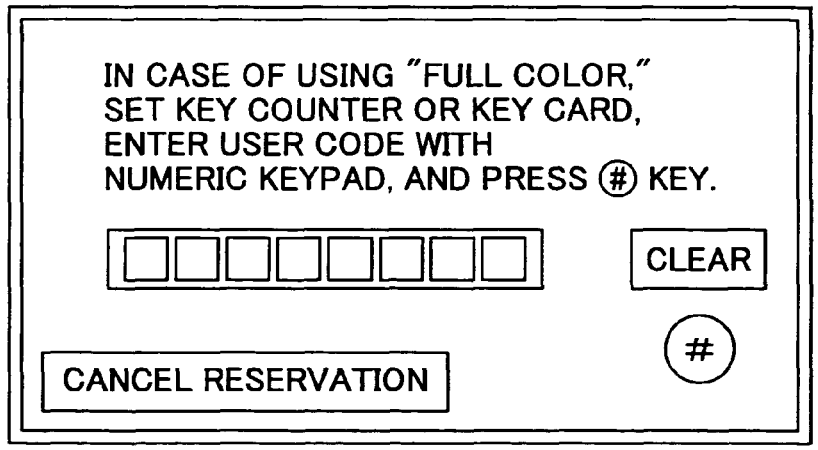
FIG. 3 is a diagram illustrating another conventional screen.
Figure 4:
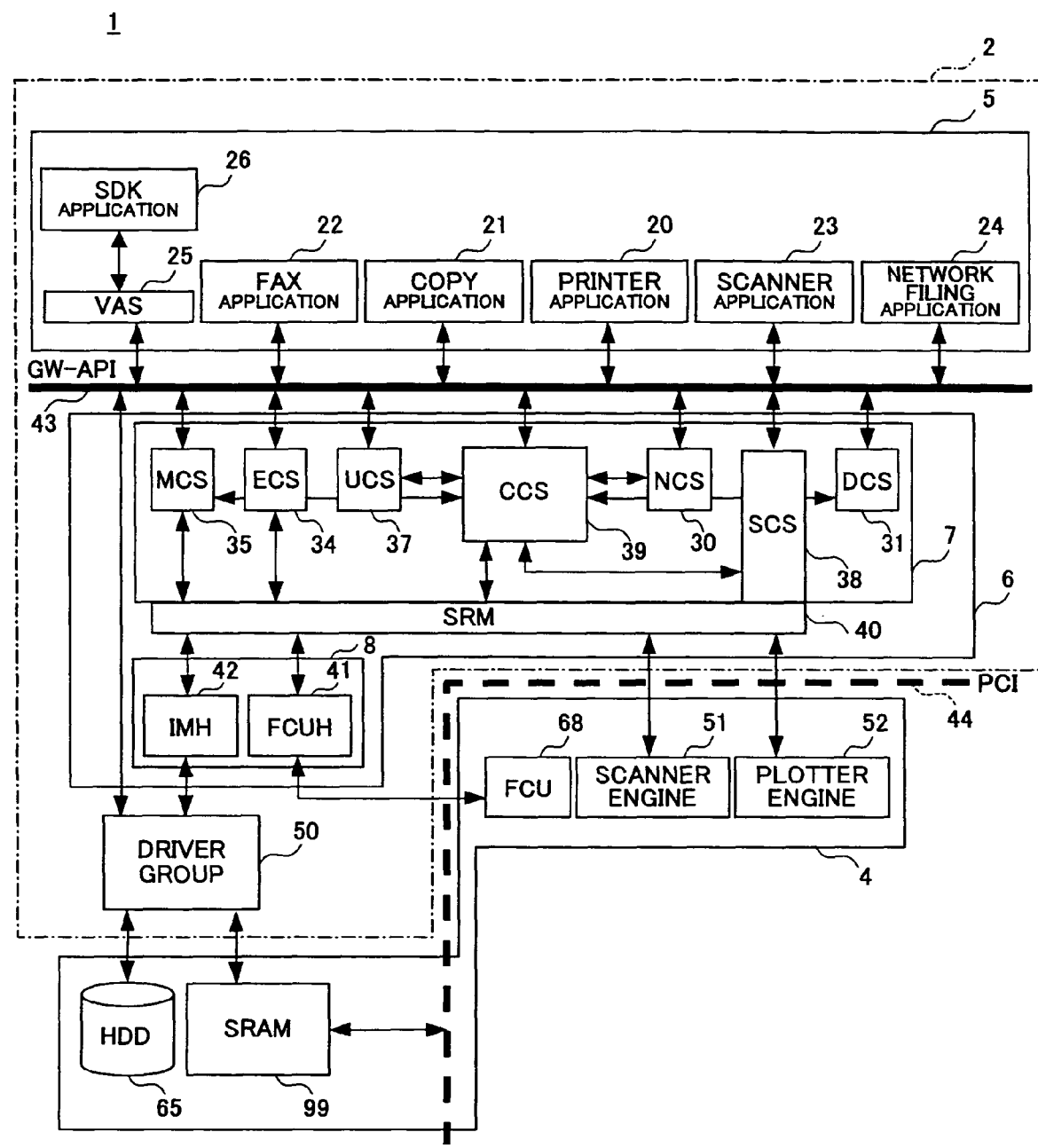
FIG. 4 is a block diagram illustrating a program installed in an MFP according to an embodiment of the present invention.

A description is given, with reference to FIG. 4, of a program installed in an MFP (MultiFunction Product) 1, which is an apparatus having multiple functions. Referring to FIG. 4, the MFP 1 includes a program group 2 and hardware resources 4.

When the MFP 1 is turned on, the MFP 1 starts an application layer 5 and a controller layer 6 in the program group 2. For instance, the MFP 1 reads out the programs of the application layers 5 and the controller layers 6 from a hard disk drive (HDD) 65, transfers the read-out programs to a memory area, and starts the programs. The hardware resources 4 include a scanner engine 51, a plotter engine 52, a facsimile control unit (FCU) 68, an SRAM 99, and the HDD 65.

The program group 2 includes the application layer 5 and the controller layer 6, which are activated on an operating system (OS) such as UNIX®. The application layer 5 includes programs executing processing characteristic of respective user services related to image formation by a printer, a copier, a facsimile machine, and a scanner, and a driver group 50.

The application layer 5 includes a printer application 20, which is an application for a printer, a copy application 21, which is an application for a copier, a FAX application 22, which is an application for a facsimile machine, a scanner application 23, which is an application for a scanner, and a network filing application 24. The application layer 5 further includes an SDK (Software Development Kit) application 26 and a VAS (Virtual Application Service) 25.

The controller layer 6 includes a control service layer 7, a system resource manager (SRM) 40, and a handler layer 8. The control service layer 7 interprets a processing request from the application layer 5 and generates a request to obtain a hardware resource (a hardware resource obtaining request). The SRM 40 manages one or more hardware resources, and arbitrates between hardware resource obtaining requests from the control service layer 7. The handler layer 8 manages hardware resources in accordance with a hardware resource obtaining request from the SRM 40.

The control service layer 7 is configured to include one or more service modules such as a network control service (NCS) 30, a delivery control service (DCS) 31, an engine control service (ECS) 34, a memory control service (MCS) 35, a user information control service (UCS) 37, a system control service (SCS) 38, and a certification and charge control service (CCS) 39.

The controller layer 6 is configured to have a GW-API 43, which makes it possible to receive a processing request from the application layer 5, by a predefined function. The OS executes the programs of the application layer 5 and the controller layer 6 in parallel as processes.

The process of the NCS 30 provides commonly usable services to applications requiring a network I/O. The process of the NCS 30 performs arbitration in distributing data received in accordance with respective protocols from the network side to applications and transmitting data from applications to the network side.

For instance, the NCS 30 controls data communications with a network apparatus connected via a network based on HTTP (HyperText Transfer Protocol) using httpd (HyperText Transfer Protocol Daemon).

The process of the DCS 31 controls delivery of stored documents. The process of the ECS 34 controls engines such as the scanner engine 51 and the plotter engine 52. The process of the MCS 35 performs memory control such as obtaining and releasing memory and using the HDD 65. The process of the UCS 37 manages user information.

The process of the SCS 38 performs processing such as application management, control of an operations part, system screen display, LED display, hardware resources management, and interruption application control.

The process of the SRM 40, together with the SCS 38, performs system control and hardware resources management. For instance, the process of the SRM 40 performs arbitration and controls execution in accordance with a hardware resource obtaining request from the upper layer using the hardware resources 4 such as the scanner engine 51 and the plotter engine 52.

Specifically, the process of the SRM 40 determines whether a hardware resource requested to be obtained is usable. If the hardware resource requested to be obtained is usable, the process of the SRM 40 notifies the upper layer that the hardware resource requested to be obtained is usable. Further, the process of the SRM 40 performs scheduling for using a hardware resource in response to a hardware resource obtaining request from the upper layer. For instance, the process of the SRM 40 directly implements the contents of requests for paper conveyance and an imaging operation by a printer engine, for memory reservation, for file generation, etc.

The handler layer 8 includes a facsimile control unit handler (FCUH) 41 and an image memory handler (IMH) 42. The FCUH 41 manages the FCU 68. The IMH 42 allocates memory to processes, and manages the allocated memory. The SRM 40 and the FCUH 41 make it possible to transmit a processing request to a hardware resource with a predefined function, and make the processing request using an engine I/F 44 for which a PCI bus is employed.

With the above-described software, each application gives the CCS 39 an instruction to display or not display a below-described authentication screen, notifies the CCS 39 of an authentication setting, and notifies the CCS 39 of a charging setting. Receiving the authentication setting notice, the CCS 39 returns an authentication state corresponding to the contents of the setting. The SCS 38 controls screen display. The SRM 40 gives an instruction on timing of charging accompanying process execution. The USC 37 obtains information on users in an address book, and provides the information to the CCS 39. The NCS 30 obtains network authentication information.

Figure 5:
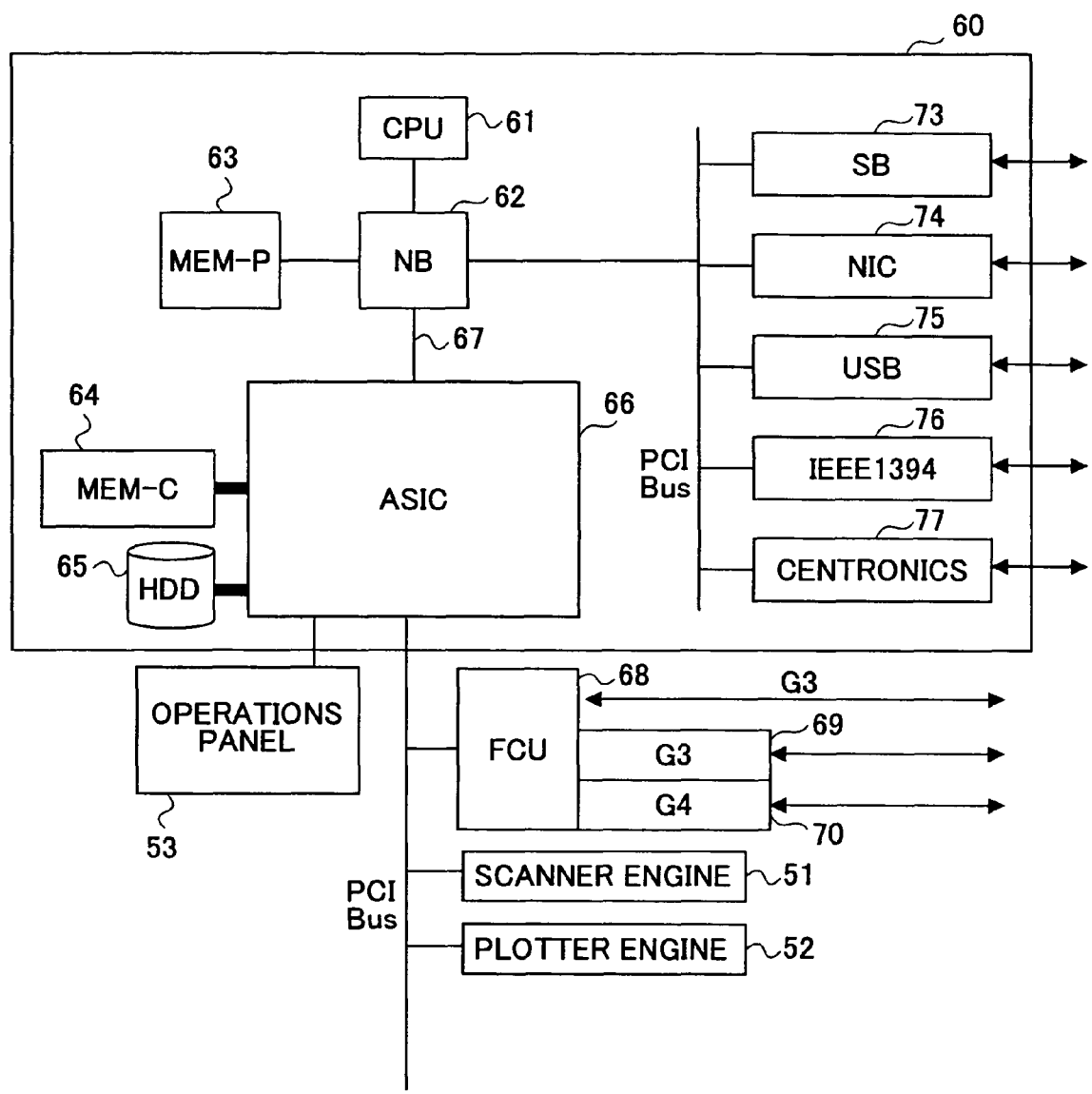
FIG. 5 is a block diagram illustrating a hardware configuration of the MFP according to the embodiment of the present invention.

FIG. 5 is a block diagram illustrating a hardware configuration of the MFP 1. The MFP 1 includes a controller board 60, an operations panel 53, the FCU 68, the scanner engine 51, and the plotter engine 52. Further, the FCU 68 includes a G3-standard-compliant unit 69 and a G4-standard-compliant unit 70.

The controller board 60 includes a CPU 61, an ASIC 66, the HDD 65, a local memory (MEM-C) 64, a system memory (MEM-P) 63, a Northbridge (NB) 62, a Southbridge (SB) 73, an NIC (Network Interface Card) 74, a USB device 75, an IEEE 1394 device 76, and a Centronics device 77.

The operations panel 53 is connected to the ASIC 66 of the controller board 60. The SB 73, the NIC 74, the USB device 75, the IEEE 1394 device 76, and the Centronics device 77 are connected to the NB 62 through a PCI bus.

The FCU 68, the scanner engine 51, and the plotter engine 52 are connected to the ASIC 66 of the controller board 60 through a PCI bus.

The controller board 60 has the local memory 64 and the HDD 65 connected to the ASIC 66, and has the CPU 61 and the ASIC 66 connected to each other through the NB 62 of the CPU chipset. Thus, connecting the CPU 61 and the ASIC 66 through the NB 62 makes it possible to cope with the case where the interface of the CPU 61 is not open to the public.

The ASIC 66 and the NB 62 are connected via not a PCI bus but an AGP (Accelerated Graphics Port) 67. Thus, in order to execute and control one or more processes forming the application layer 5 and the controller layer 6 of FIG. 4, the ASIC 66 and the NB 62 are connected via not a low-speed PCI bus but the AGP 35, thereby preventing a decrease in performance.

The CPU 61 controls the entire MFP 1. The CPU 61 causes the NCS 30, the DCS 31, the ECS 34, the MCS 35, the UCS 37, the CCS 39, the SCS 38, the SRM 40, the FCUH 41, and the IMH 42 to be activated as processes on the OS and executed. Further, the CPU 61 causes the printer application 20, the copy application 21, the FAX application 22, the scanner application 23, the network filing application 24, and the SDK application 26 forming the application layer 5 to be activated and executed.

The NB 62 is a bridge for connecting the CPU 61, the system memory 63, the SB 73, and the ASIC 66. The system memory 63 is used as a drawing memory for the MFP 1. The local memory 64 is used as a copy image buffer and a code buffer. The system memory 63 and the local memory 64 correspond to the SRAM 99 of FIG. 4. The SB 73 is a bridge for connecting the NB 62 to a PCI bus and peripheral devices.

The ASIC 66 is an IC for image processing including a hardware element for image processing. The HDD 65 is storage for image data, document data, programs, font data, and forms. The operations panel 53 is an operations part receiving input operations from and displaying information to a user.

An authentication and charging device is added to the above-described hardware configuration as required. According to this embodiment, a key card, a coin rack, a multifunction (MF) key card, and a key counter, each of which corresponds to an authentication and charging part, may be employed as the authentication and charging device.

Next, a detailed description is given of the CCS 39. The CCS 39 achieves the same function as the authentication/charging/user restriction function conventionally performed by the SCS. The CCS 39 issues information on a usable function (an unusable function) corresponding to an authenticated individual (hereinafter, restriction information) as a result of role-based access (personal authentication by a user logon) for supporting increased security. The CCS 39 can be expanded easily at the time of introducing a new authentication or charging method.

Figure 6:
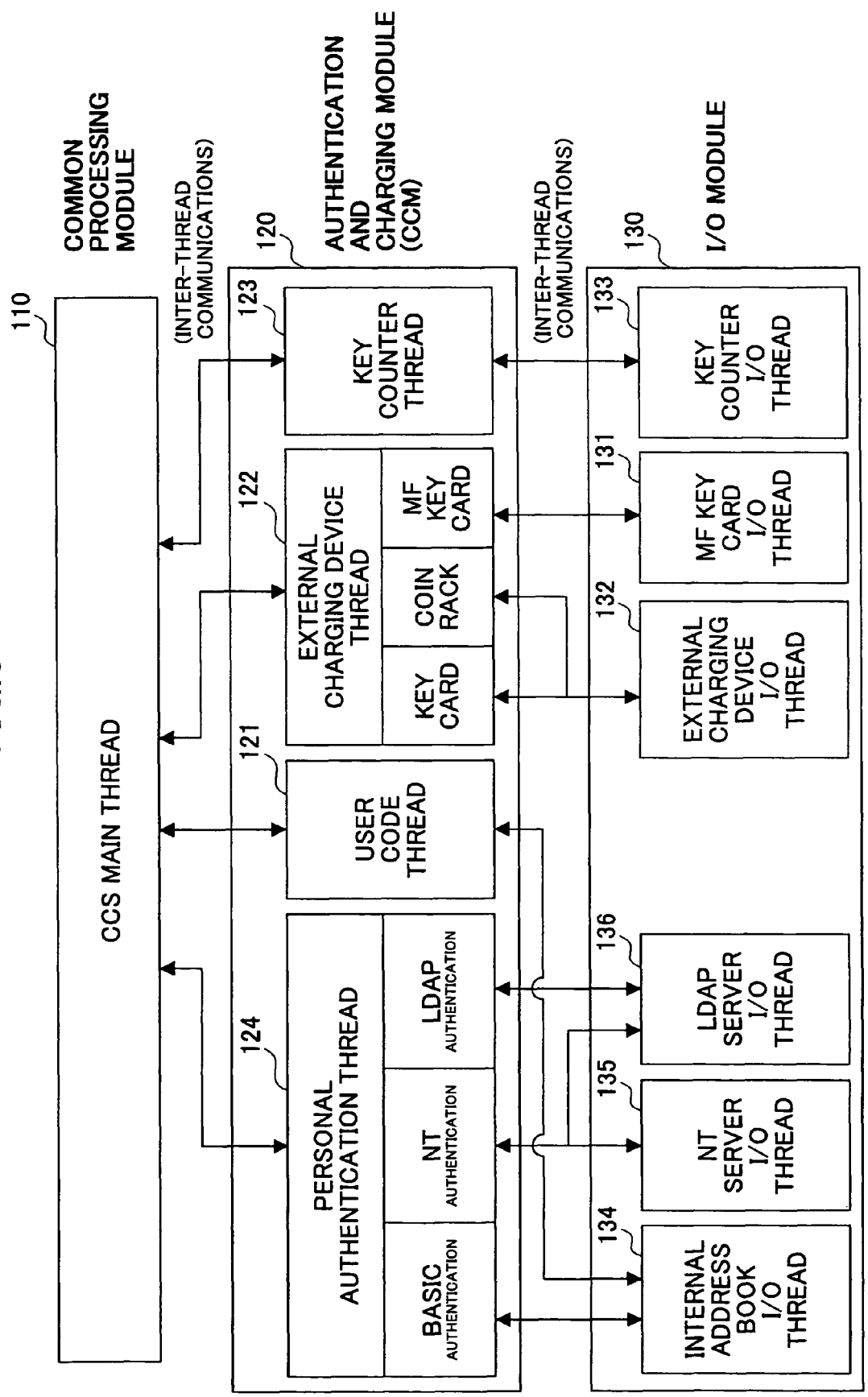
FIG. 6 is a block diagram illustrating a thread configuration of a CCS according to the embodiment of the present invention.

FIG. 6 is a block diagram illustrating a thread configuration of the CCS 39. The thread configuration of the CCS 39 includes a CCS main thread 110, which is a common processing module, an authentication and charging module group 120, and an I/O module 130. Hereinafter, an authentication and charging module or the authentication and charging module group 120 may be referred to as CCM.

The CCS main thread 110, which is the interface of applications and other modules, manages authentication, manages charging, and creates screens. The created screens are displayed on the operations panel 53. The operations panel 53 and the CCS 39 correspond to a character string display part, a type character string display part, and an authentication information input part.

Next, a description is given of the authentication and charging module group 120. The authentication and charging module group 120 includes a personal authentication thread 124, a key counter thread 123, an external charging device thread 122, and a user code thread 121, which are authentication and charging modules. The authentication and charging module group 120 manages authentication, manages charging, and creates screens according to an authentication method. These authentication and charging modules are provided for corresponding authentication and charging devices, but are basically threads of the same configuration. Each authentication and charging module is caused to operate based on an instruction indicating (designating) the authentication and charging module as a thread to operate, which is described in detail below.

The personal authentication thread 124 performs basic authentication, NT authentication, and LDAP authentication. The user code thread 121 performs authentication using a user code. The key counter thread 123 corresponds to the case of using a key counter as the authentication and charging device.

The external charging device thread 122 corresponds to the case of using a key card, a coin rack, or an MF key card as the authentication and charging device.

Next, a description is given of the I/O module 130 inputting and outputting information on charging and authentication. The I/O module 130 includes an internal (in-apparatus) address book I/O thread 134, an NT server I/O thread 135, an LDAP server I/O thread 136, an external charging device I/O thread 132, an MF key card I/O thread 131, and a key counter I/O thread 133. The I/O module 130 communicates with the modules of the application layer 5 and the control service layer 7 and the authentication and charging devices so as to receive the authentication state of each device and issue an authentication request.

The internal address book I/O thread 134 performs communications regarding an internal (in-apparatus) address book. The internal address book refers to information on user addresses obtained through the UCS 37. The NT server I/O thread 135 communicates with a server performing the above-described NT authentication. The LDAP server I/O thread 136 communicates with a server performing the above-described LDAP authentication.

The external charging device I/O thread 132 communicates with an external charging device key card coin rack. The external charging device key card coin rack refers to a device for the case of using the MFP 1 employing a key card or coin rack. The MF key card I/O thread 131 communicates with an MF key card charging device. The MF key card has a variety of functions in addition to those of the key card. The key counter I/O thread 133 communicates with a key counter.

The thread configuration of the CCS 39 is as described above. Next, a description is given, with reference to FIG. 7, of an operation of each CCM as a designated thread.

Figure 7:
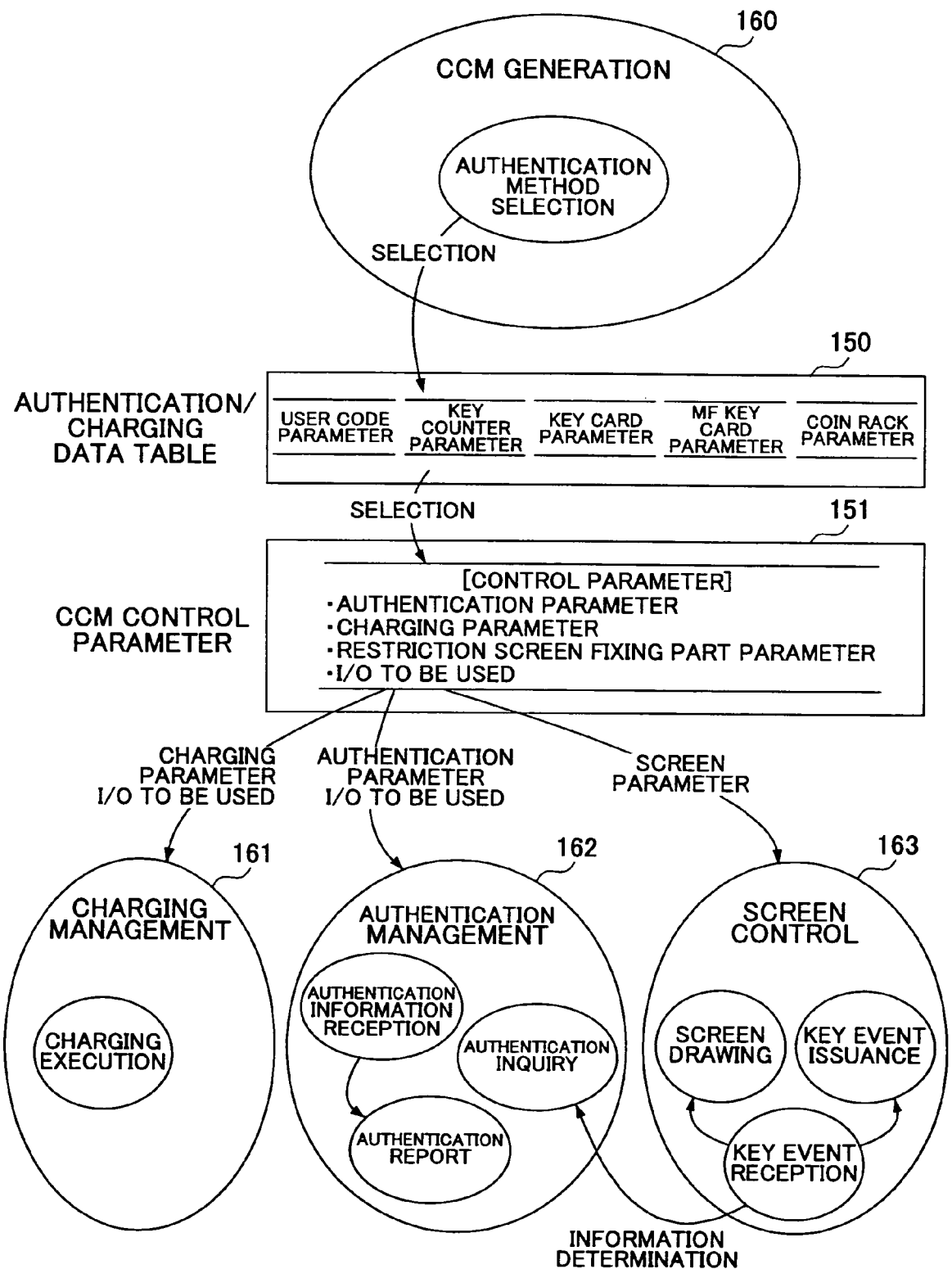
FIG. 7 is a diagram illustrating the operation of each CCM as a specified thread according to the embodiment of the present invention.

FIG. 7 is a diagram illustrating up to a final mode for the CCM performing an operation specified by the CCS 39, obtaining a variety of parameters in order to perform the specified operation. FIG. 7 illustrates a CCM generation stage 160, an authentication and charging device data table 150, CCM control parameters 151, charging management 161, authentication management 162, and screen control 163.

At the CCM generation stage 160, an authentication method for operating as a designated CCM is selected. Thereafter, the CCM obtains a parameter from the authentication and charging device data table 150. The authentication and charging device data table 150 includes a user code parameter, a key card parameter, a key counter parameter, an MF key card parameter, and a coin rack parameter. These parameters are information on the above-described authentication and charging devices.

Next, the CCM obtains common parameters from the CCM control parameters 151. The common parameters include an authentication parameter, a charging parameter, a restriction information fixing part parameter, and an I/O to be used.

The charging management 161, the authentication management 162, and the screen control 163 are generated in correspondence to the parameters. The charging management 161 manages and executes charging. The authentication management 162 receives authentication information and reports authentication. Further, the authentication management 162 responds to an authentication inquiry from the screen control 163. The screen control 163 receives a key event from the operations panel 53, and performs screen drawing and key event issuance corresponding to the key event. When information is determined by the key event, the screen control 163 sends an inquiry to the authentication management 162.

Figure 8:
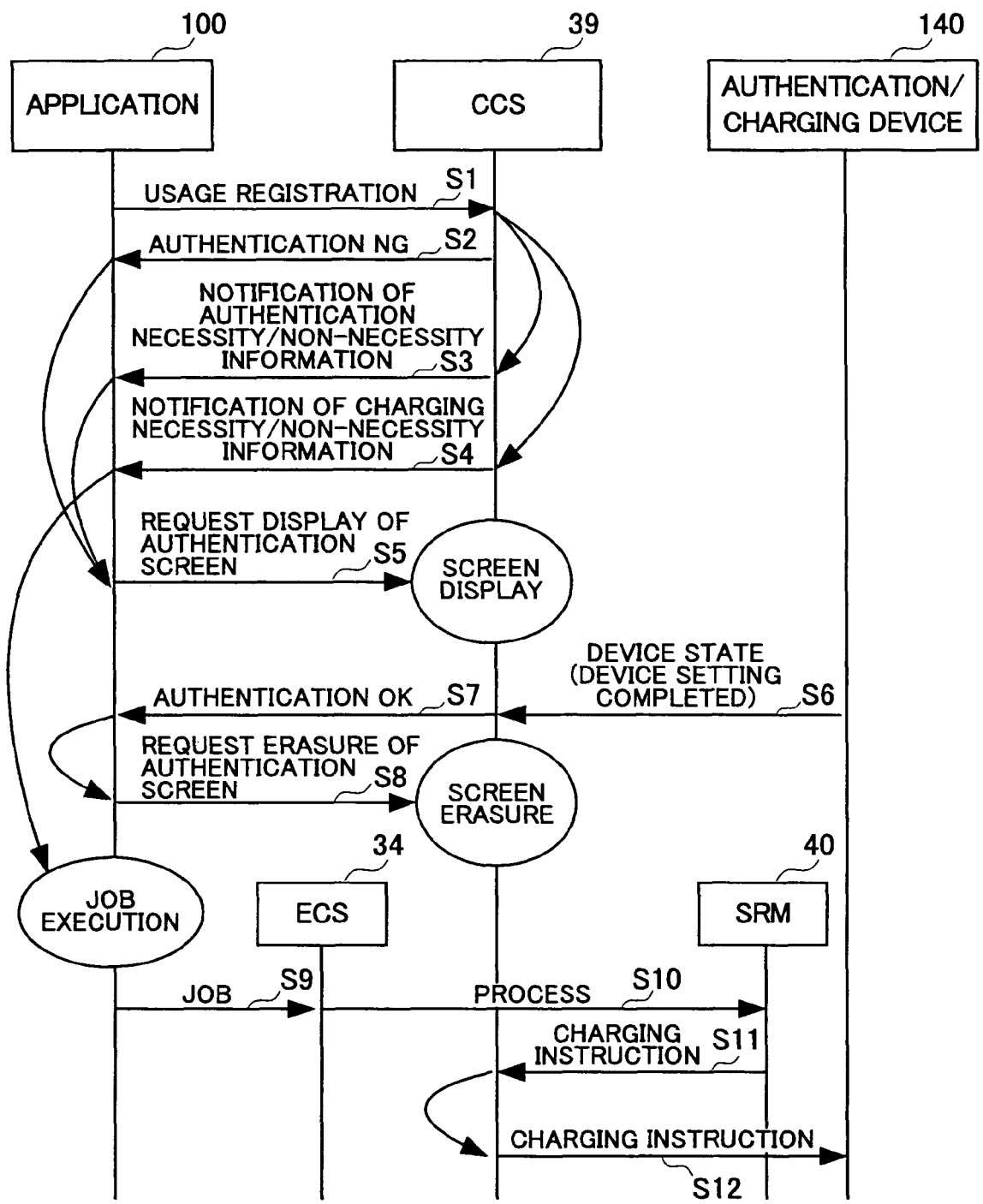
FIG. 8 is a diagram illustrating a basic authentication sequence according to the embodiment of the present invention.

Next, a description is given, with reference to FIG. 8, of a basic authentication sequence. FIG. 8 is a sequence diagram illustrating processing performed among an application 100, the CCS 39, an authentication and charging device 140, the ECS 34, and the SRM 40.

In step S1 of FIG. 8, the application 100 makes usage registration with the CCS 39. The usage registration, which is a request for registration of the application 100 for using the CCS 39, is normally made at the time of activation of the application 100. This notice is given in order for the application 100 to request information on authentication and charging necessary for a function to be performed by the application 100. For instance, notice is given that the copy application 21 requests authentication and charging setting information regarding copying and a document box in order to perform processing using a document box module.

After being notified of the usage registration (request) in step S1, if the authentication and charging device 140 is unusable because of, for instance, disconnection, in step S2, the CCS 39 notifies the application 100 of an authentication failure (AUTHENTICATION NG). If the authentication and charging device 140 is usable, in step S3, the CCS 39 notifies the application 100 of an authentication success (AUTHENTICATION OK).

In step S3, the CCS 39 notifies the application 100 of authentication necessity/non-necessity information, which gives notice of a type of authentication required in performing a function. For instance, notice is given that a restriction by AUTHENTICATION METHOD 1 is imposed on the monochrome function of a copier. A description is given below of authentication methods such as AUTHENTICATION METHOD 1.

Next, in step S4, the CCS 39 notifies the application 100 of charging necessity/non-necessity information, which gives notice of a type of charging required in performing a function. For instance, notice is given that it is necessary to execute charging by AUTHENTICATION METHOD 1 in the case of performing monochrome printing by a copier.

In step 5, based on the above-described information, the application 100 requests the CCS 39 to display an authentication screen, and the CCS 39 displays the screen. This display operation corresponds to the step of displaying a character string, the step of displaying a type character string, and the step of inputting authentication information.

This notification of step S5 is performed, when the application 100 intends to perform a function but an authentication state necessary for performing the function is not AUTHENTICATION OK, in order to display a message to that effect on the operations panel 53 and prompt a user to give an instruction to obtain authentication.

For instance, if the copy application 21 intends to perform monochrome printing but the authentication state of AUTHENTICATION METHOD 1 is not OK, the request is made in order to request the CCS 39 to display a usage restriction screen corresponding to AUTHENTICATION METHOD 1.

In step S6, the authentication and charging device 140 notifies the CCS 39 of the state of the authentication and charging device 140. Then, in step S7, the CCS 39 notifies the application 100 of AUTHENTICATION OK.

Being notified of AUTHENTICATION OK, in step S8, the application 100 requests the CCS 39 to erase the authentication screen, and the CCS 39 erases the screen.

In the application 100, job execution is started, and in step S9, a job is passed to the ECS 34 in order to cause various engines to operate. At this point, if notice is given in step S4 that charging is required, the ECS 34 is also notified of below-described charging information as job information. With respect to charging unrelated to this job, exceptionally, the CCS 39 may be directly instructed to execute charging.

In step S10, the ECS 34 notifies the SRM 40 of a process. If charging is required, in step S11, the SRM 40 instructs the CCS 39 to execute charging. In step S12, the CCS 39 notifies the authentication and charging device 140 of an instruction to execute charging.

The basic authentication sequence is as described above. A description is given below of a detailed sequence. Next, a description is given of the charging information. The charging information includes an authentication method number, a parameter for engine control, information as to whether to check the state of connection of a charging device, information as to whether counting is incremental (additive) or decremental (subtractive), information as to whether to count with a key counter or a key card, and user ID information.

Figure 9:
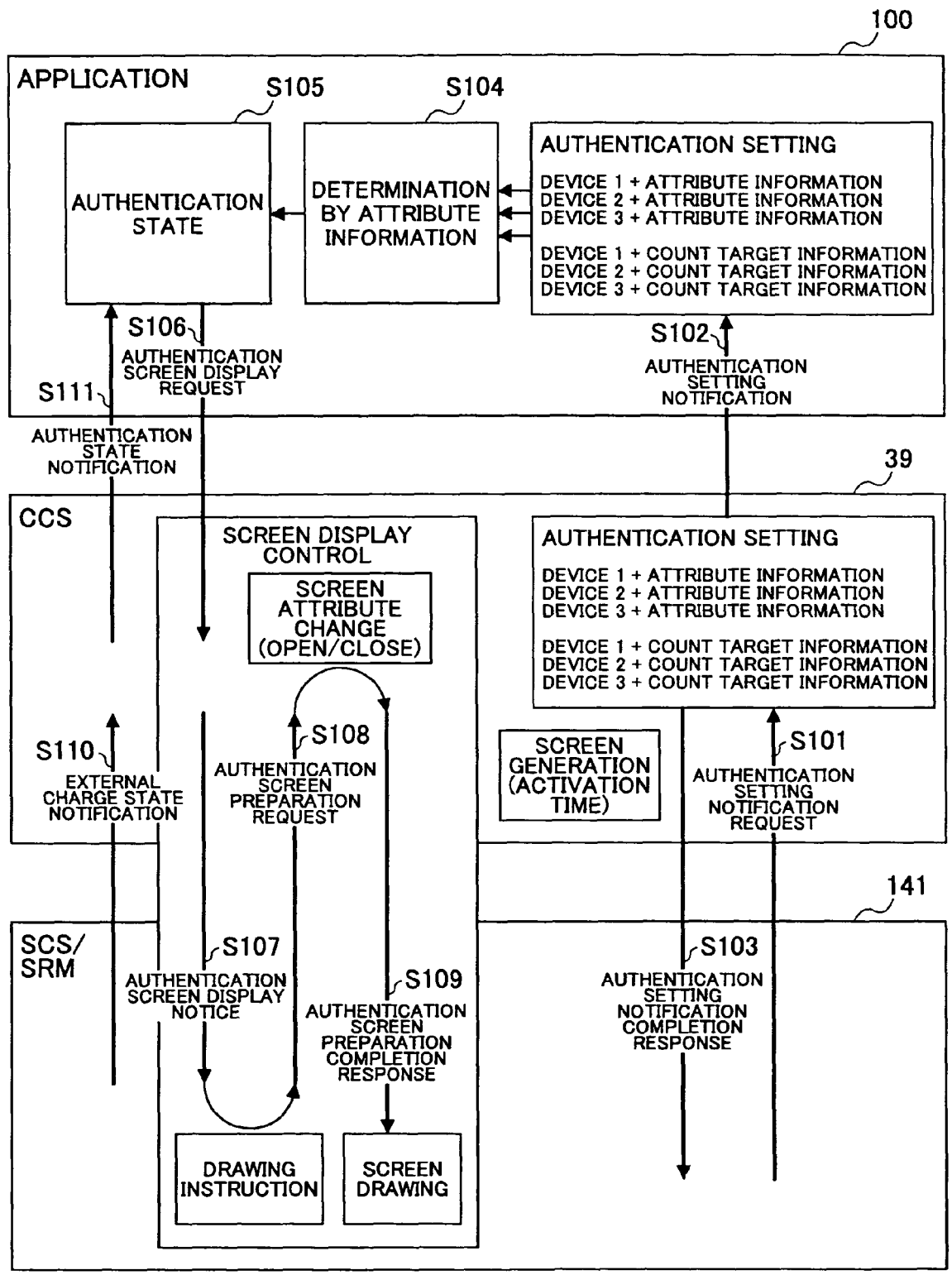
FIG. 9 is a diagram illustrating the details of data contents in the sequence diagram of FIG. 8 according to the embodiment of the present invention.

Next, a description is given, with reference to FIG. 9, of the interchange among the application 100, the CCS 39, and an SCS/SRM 141. FIG. 9 is a diagram illustrating the details of data contents in the sequence diagram of FIG. 8. First, in step S101 of FIG. 9, the SCS/SRM 141 transmits an authentication setting notification request to the CCS 39. Next, in step S102, the CCS 39 transmits an authentication setting notice to the application 100. Thereafter, in step S103, the CCS 39 transmits an authentication setting notification completion response to the SCS/SRM 141.

A set of a device and attribute information, such as "DEVICE 1+ATTRIBUTE INFORMATION," corresponds to an authentication method, and is the contents of the notification of the authentication necessity/non-necessity information of step S3 of FIG. 8. Further, a set of a device and count target information, such as "DEVICE 1+COUNT TARGET INFORMATION," is the contents of the notification of the charging necessity/non-necessity information of step S4 of FIG. 8. Further, the attribute information is the contents of a below-described authentication method details notice.

Receiving the authentication setting notice, in step S104, the application 100 performs determination by the attribute information. Further, in step S105, the application 100 determines the authentication state, and based on the determination of step S105, in step S106, the application 100 transmits an authentication screen display request to the CCS 39. In step S107, the CCS 39 transmits an authentication screen display notice to the SCS/SRM 141. The SCS/SRM 141 gives an instruction to perform drawing, and in step S108, the SCS/SRM 141 transmits an authentication screen preparation request to the CCS 39. The CCS 39 changes a screen attribute, and in step S109, the CCS 39 transmits an authentication screen preparation completion response to the SCS/SRM 141. Then, the SCS/SRM 141 performs screen drawing.

Further, in step S110, the SCS/SRM 141 transmits an external charging state notice to the CCS 39. Receiving the external charging state notice, in step S111, the CCS 39 notifies the application 100 of an external charging state as an authentication state.

DEVICE 1, DEVICE 2, etc., shown in FIG. 9 are IDs used for convenience in order to distinguish between authentication methods, and do not represent specific types of authentication and charging devices. The specific types of authentication and charging devices are abstracted, and the abstracted types are represented by the attribute information in FIG. 9.

Next, a description is given, using the tables of FIGS. 10 through 12, of an example of authentication performed with the above-described configuration. These tables show authentication methods representing types of authentication, and remarks corresponding to the authentication methods.

FIG. 10 shows examples of authentication to be performed independently, listing 40 types of authentication methods. FIGS. 11 and 12 show examples of combination authentication. The examples of authentication shown in FIG. 11 and the examples of authentication shown in FIG. 12 are to be performed in combination with each other. In this case, FIG. 11 lists 23 types of authentication methods, and FIG. 12 lists nine types of authentication methods. Accordingly, the total number of types of authentication is 207.

Next, a description is given of the notification of an authentication setting to each application described with reference to FIG. 9. As described above, the CCS 39 notifies each application of an authentication setting based on an SP/UP setting, the authentication setting showing which authentication method is required in order to perform a function. The SP/UP setting shows the contents of a setting provided by a service person giving a maintenance check of the MFP 1 and/or by a user. The setting contents are, for instance, that key counter authentication is required for monochrome copy printing or that key counter authentication and user code authentication are required for color copy printing.

Here, the authentication setting of which the application is notified reports only information on a function requiring authentication. In addition to authentication, restrictions on the function include those accompanying a user logon. However, restriction information that has no direct relation to authentication is not reported as an authentication setting, but is separately reported as a function restriction. The function restriction refers to a restriction on the function due to a user's individual situation, which is OK as an authentication state.

Based on the SP/UP setting, the CCS 39 notifies the application registered therewith (registered application) of a function-by-function authentication setting. A description is given, with reference to FIG. 13, of an example of the authentication setting. FIG. 13 shows functions requiring authentication and authentication methods corresponding to the functions. For instance, it is possible to perform full-color printing by performing authentication with AUTHENTICATION METHOD 1 or AUTHENTICATION METHOD 2. AUTHENTICATION METHOD 1 or AUTHENTICATION METHOD 2 shows that authentication is performed by selecting one of the two authentication methods of AUTHENTICATION METHOD 1 and AUTHENTICATION METHOD 2. This selection is performed by the application.

In order to make the type of authentication device transparent to the application, a specific authentication method name such as a user code or key counter is not presented, but an abstract name such as AUTHENTICATION METHOD 1 or AUTHENTICATION METHOD 2 is presented as described above. When there is a change in the SP/UP setting, the authentication method is changed, and the registered application is notified of the change. Specifically, the values set by UP include a personal authentication method (local/NT/LDAP/user code/no authentication), the presence or absence of user code authentication, the presence or absence of key counter authentication, and the presence or absence of external charging device authentication. Specifically, the values set by SP include the type of external charging device (addition-type key card/MF key card).

Figure 14:
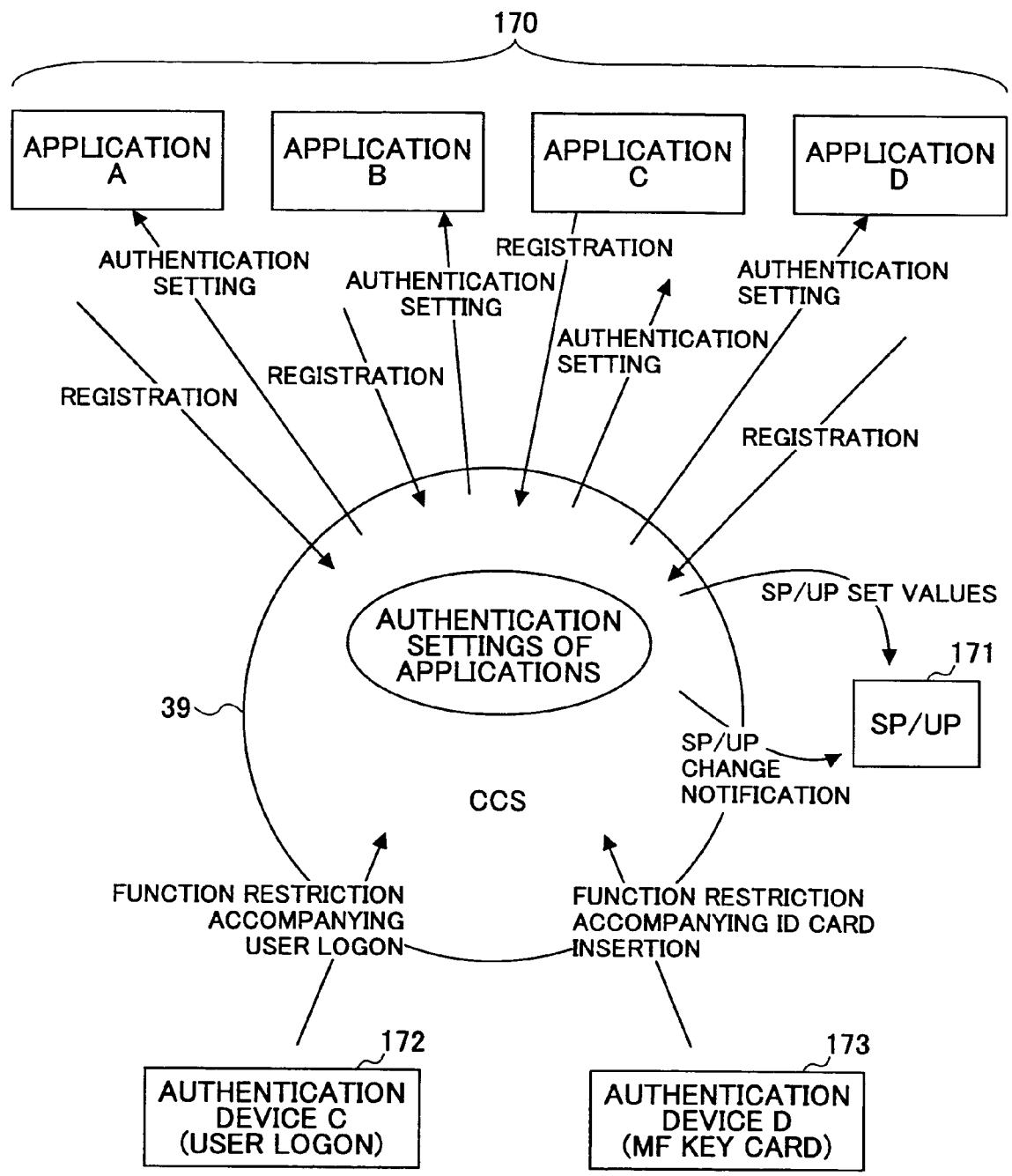
FIG. 14 is a diagram illustrating the authentication settings among the CCS, applications, and authentication devices according to the embodiment of the present invention.

FIG. 14 is a diagram illustrating the authentication settings among the CCS 39, applications (A, B, C, and D) 170, and authentication devices (C and D) 172 and 173. The CCS 39, having each application 170 registered therewith, notifies the application 170 of an authentication setting based on SP/UP set values 171 as described above. The authentication device (C) 172 notifies the CCS 39 of a function restriction accompanying a user logon. The authentication device (D) 173 notifies the CCS 39 of a function restriction accompanying the insertion of an ID card.

Figure 15:
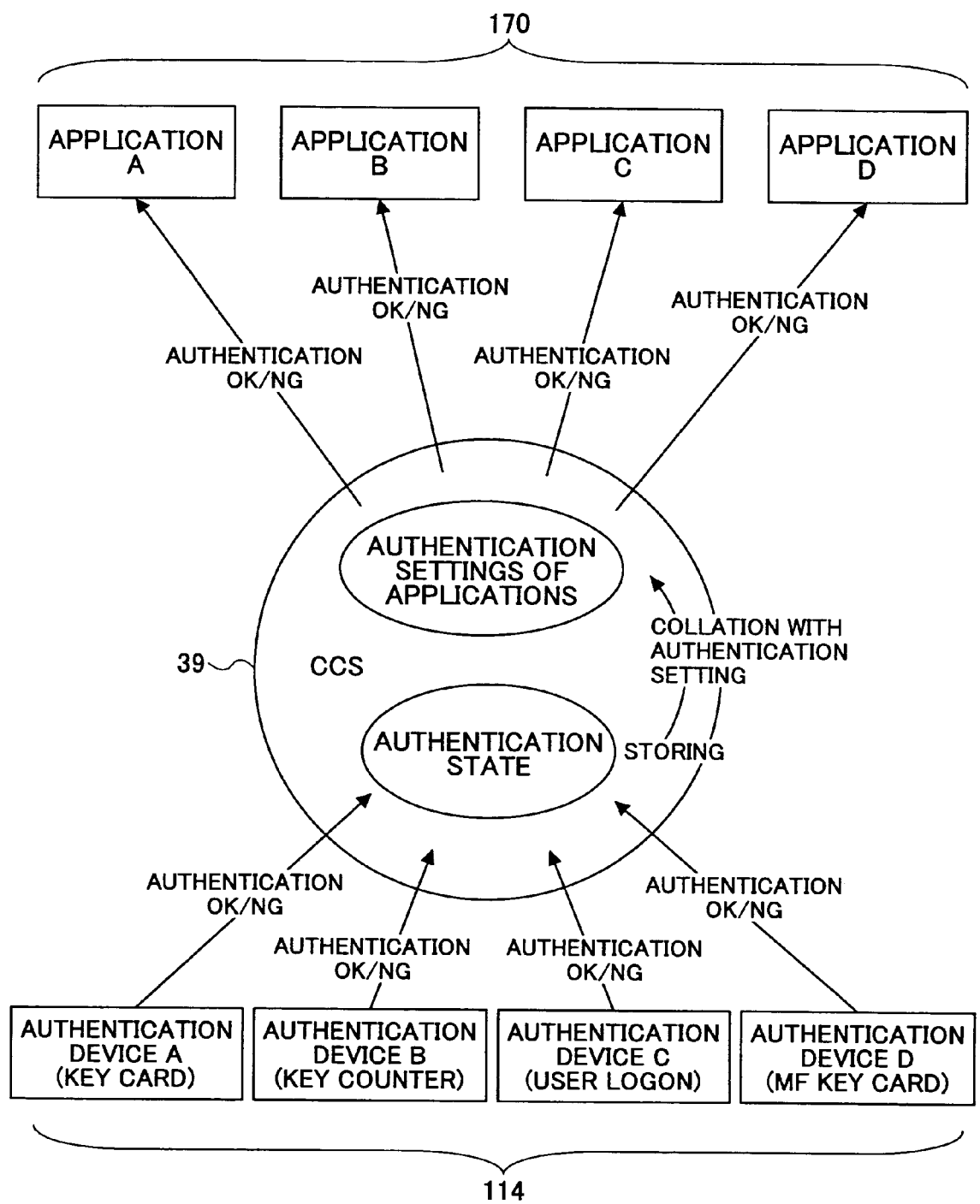
FIG. 15 is a diagram illustrating the relationship among the CCS, the applications, and authentication devices in providing authentication settings according to the embodiment of the present invention.

FIG. 15 is a diagram illustrating the relationship among the CCS 39, the applications 170, and authentication devices (A, B, C, and D) 114 in providing authentication settings.

As illustrated in FIG. 15, the CCS 39 notifies each application 170 of an authentication state reported from the corresponding authentication device 114. The CCS 39 stores information necessary for authentication received from each authentication device 114 as a received authentication state. The CCS 39 transmits authentication OK/NG information to any of the applications 170 requiring the authentication of the corresponding authentication device 114 in order to perform its function. As described above, it is determined based on the SP/UP setting information which authentication method is required in order to perform the function.

Next, a description is given of an authentication screen. The CCS 39 generates an authentication screen corresponding to the usage restriction state of the MFP 1. The generated screen is displayed based on the instruction of the application. The authentication screen may be, for instance, a charging method authentication request screen requesting insertion of a key card or a user logon screen.

The CCS 39, which thus generates an authentication screen, does not have a screen that is directly aware of the action of the application or the type of a restricted function. This is because having a screen that is directly aware of the action of the application or the type of a restricted function would cause the CCS 39 to have a corresponding screen every time an application or a new function restriction is added, thus significantly reducing the extensibility of the CCS 39.

Figure 16:
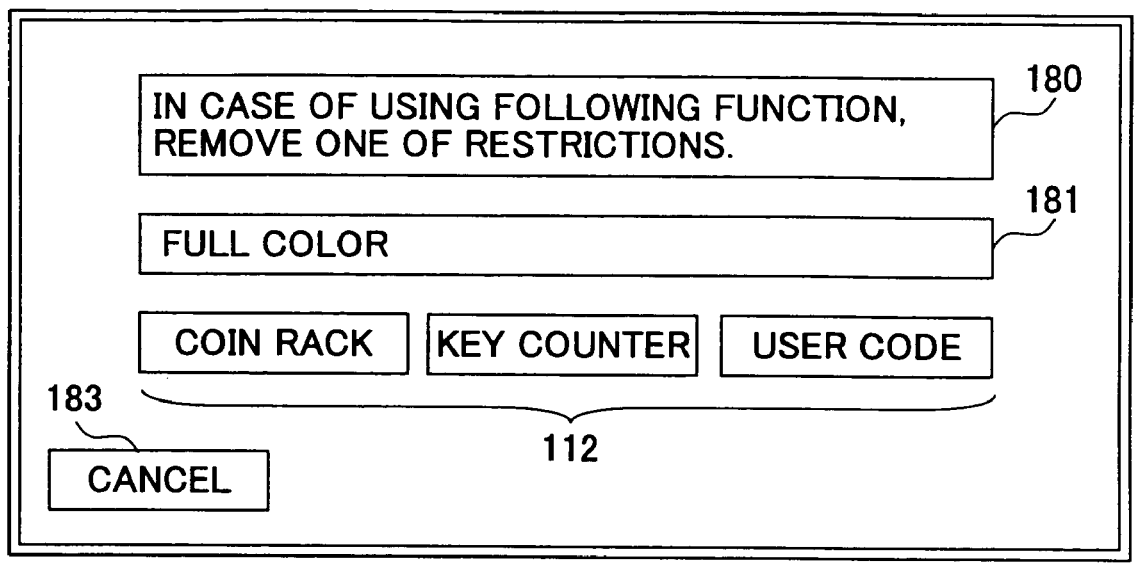
FIG. 16 is a diagram illustrating an authentication screen for combination authentication according to the embodiment of the present invention.

A description is given below, with reference to the drawings, of authentication screens generated by the CCS 39. FIG. 16 is a diagram illustrating a screen for performing authentication for full-color copying with one of a coin rack, key counter, and user code.

The screen of FIG. 16 shows a fixed message display column 180, a function display column 181, an authentication button 112, and a cancellation button (cancel) 183. A character string displayed in the fixed message display column 180 corresponds to a character string displayed by a character string display part. A character string displayed in the function display column 181 corresponds to a character string displayed by a type character string display part. The authentication button 112 corresponds to an input object.

Thus, providing the fixed message display column 180 and the function display column 181 separately makes it possible to specify character strings displayed in the columns 180 and 181 independent of each other. Further, the character strings displayed in the fixed message display column 180 and the function display column 181 have no such relationship that a change of one affects the other. Accordingly, it is easy to replace the character strings displayed in the columns 180 and 181.

A description is given of the fixed message display column 180. As illustrated in FIG. 16, text reading IN CASE OF USING FOLLOWING FUNCTION, REMOVE ONE OF RESTRICTIONS. is displayed in the fixed message display column. Thus, by using FOLLOWING FUNCTION, it is possible to display a character string that does not include the type of image forming processing. Further, text displayed in the fixed message display column 180 is a character string prompting the type of authentication to be selected.

Next, a description is given of the function display column 181. The function display column 181 displays a character string (FULL-COLOR in the case of FIG. 16) corresponding to a function name specified by the application. Thus, the CCS 39 prepares a column for displaying a character string specified by the application, and displays the specified character string in the column.

Next, a description is given of the authentication button 112. The authentication button 112 displays an authentication button corresponding to a function. In the case of FIG. 16, three authentication buttons are displayed. If authentication may be performed with a single type of authentication, one authentication button is displayed.

The cancellation button 183 is a button for erasing a displayed screen. Operational specifications at the time of the pressing of the cancellation button 183 are left up to the discretion of the application that has given an instruction to display the button 183. Therefore, at the time of requesting display of a restriction screen, the application is caused to specify the presence or absence of a button, a character string to be displayed in the button, and an event type to be reported to the application at the time of pressing the button.

In addition, it is left up to the discretion of the application whether to display an authentication screen accompanying a function restriction. In this case, specifications may be such that the brightness of the selection key of the restricted function is reduced by half, or that the authentication screen itself is not displayed. The CCS 39 gives no instruction as to the specifications.

The effects of pressing down a button on the authentication screen are left up to the discretion of the application. For instance, if a restriction accompanying authentication is imposed on a duplex function, effects such as switching to a single-side mode by pressing down a button on the authentication screen, returning to the original screen without changing a setting, and resetting a job are left up to the discretion of the application. At this point, a key event is transmitted to the application. Accordingly, a key event number is specified by the application in advance.

Figure 17:
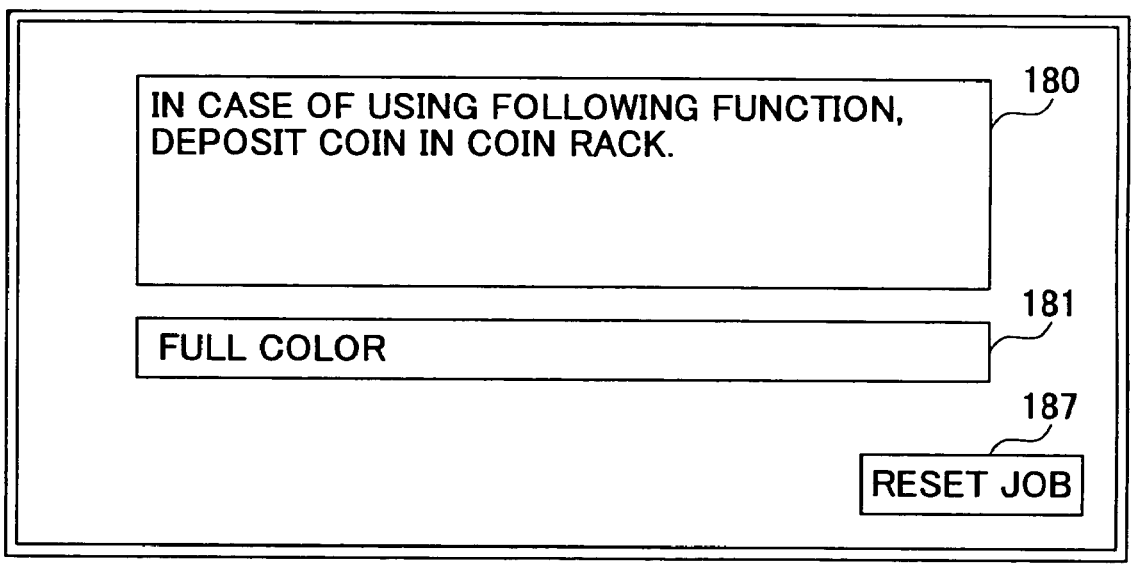
FIG. 17 is a diagram illustrating a coin rack authentication screen according to the embodiment of the present invention.

The basic contents of screens are as described above. A description is given below of authentication screens. FIG. 17 illustrates a screen for the case where the authentication device is a coin rack. In the case of a coin rack, the fixed message display column 180, the function display column 181, and a job reset button (RESET JOB) 187 are displayed on the screen. The job reset button 187 is a button for resetting a job.

Figure 18:
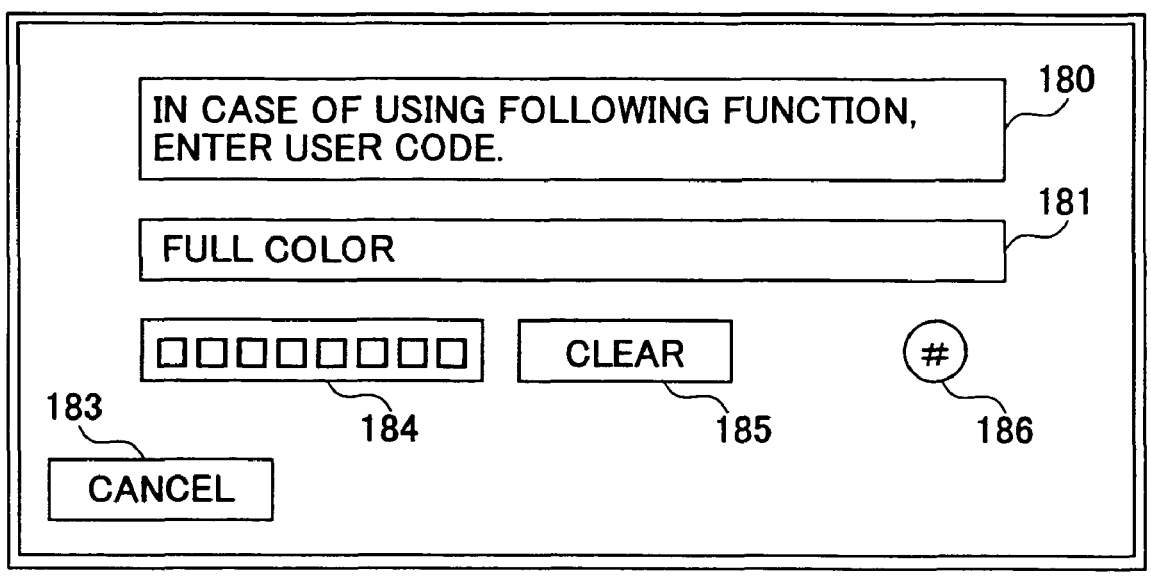
FIG. 18 is a diagram illustrating a user code authentication screen according to the embodiment of the present invention.

FIG. 18 illustrates a screen for the case of performing authentication with a user code. In the case of a user code, the fixed message display column 180, the function display column 181, a user code entry column 184, a clear button (CLEAR) 185, a button 186, and the cancellation button 183 are displayed on the screen. A user enters a user code in the user code entry column 184. The clear button 185 is a button for erasing the user code when, for instance, a wrong user code is entered. The # button 186 is a button for entering a #.

Figure 19:
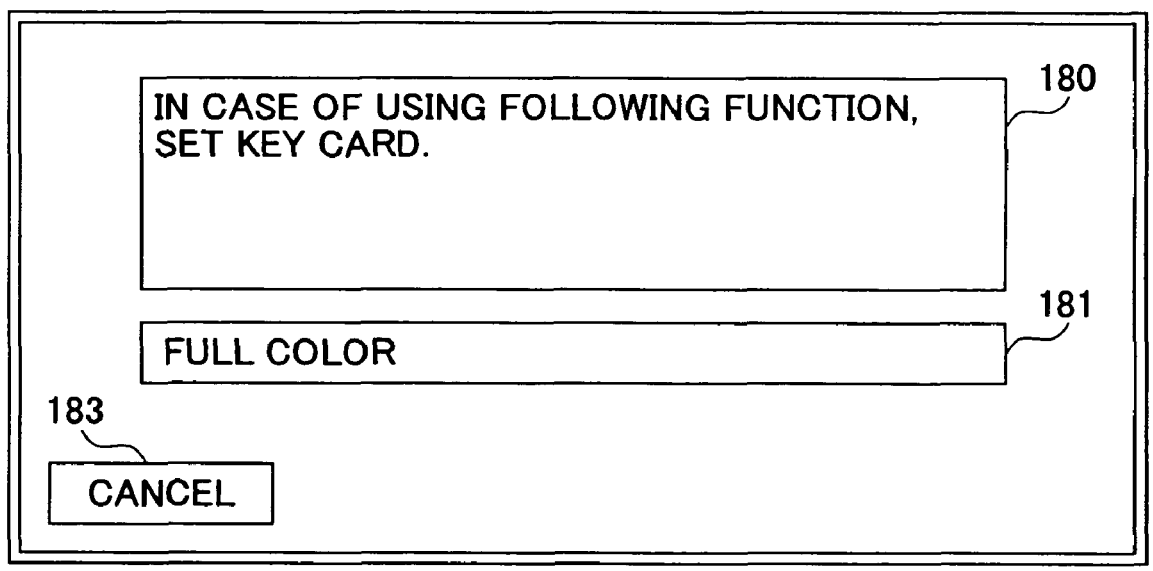
FIG. 19 is a diagram illustrating a key card authentication screen according to the embodiment of the present invention.

FIG. 19 illustrates a screen for the case of using a key card as an authentication device. In the case of a key card, the fixed message display column 180, the function display column 181, and the cancellation button 183 are displayed on the screen.

Figure 20:
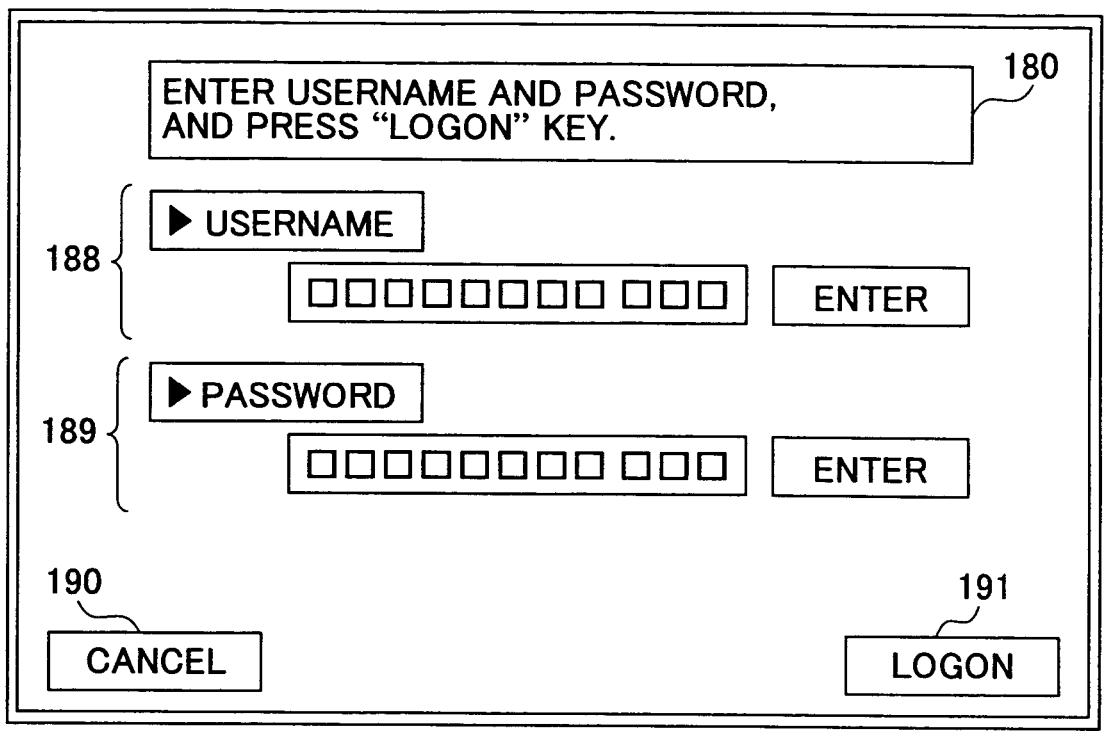
FIG. 20 is a diagram illustrating a logon authentication screen according to the embodiment of the present invention.

FIG. 20 illustrates a logon screen. The fixed message display column 180, a username entry column 188, a password entry screen 189, a cancellation button (cancel) 190, and a logon button (LOGON) 191 are displayed on the logon screen.

A username is put in the username entry column 188, and thereafter, is entered by pressing an entry button (ENTER). A password is put in the password entry column 189, and thereafter, is entered by pressing an entry button (ENTER). After entering the username and password, a logon is made with the logon button 191. In the case of a logon failure, this screen can be erased with the cancellation button 190.

The user code entry column 184, the username entry column 188, and the password entry column 189 are objects of an input (entry) column form.

The above-described screens are example authentication screens. Thus, on the authentication screen, the name of a restricted function can be specified separately, so that only the function name is replaced when a new combination of authentication methods is generated.

Figure 21:
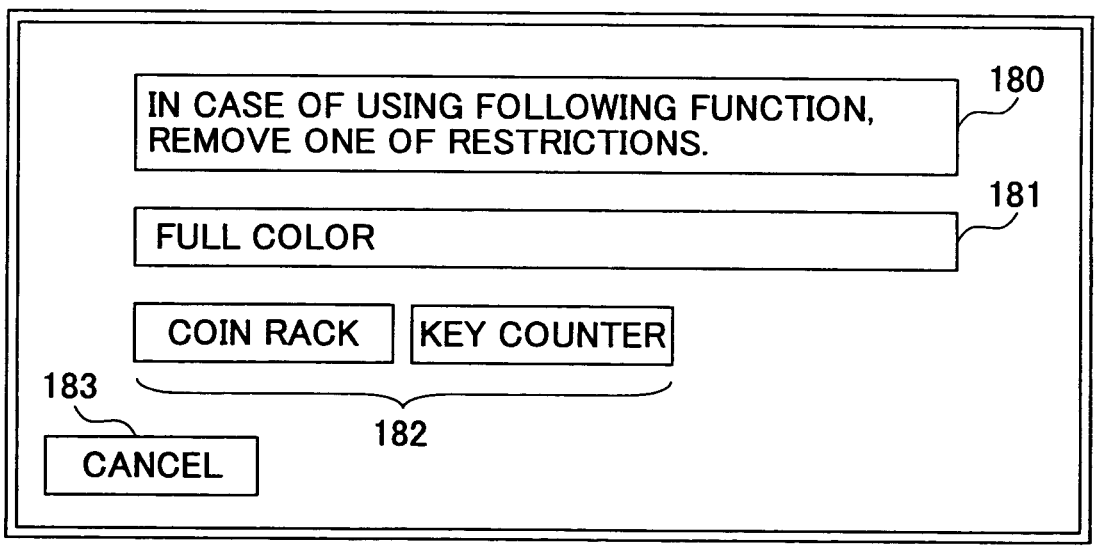
FIG. 21 is a diagram illustrating an authentication screen for combination authentication according to the embodiment of the present invention.

In the case of combination authentication, screens corresponding to authentication methods are successively displayed on the screen. For instance, when the first authentication is performed with a user code, and the next authentication is performed with a coin rack or key counter, first, the authentication screen with a user code illustrated in FIG. 18 is displayed, and if the authentication is OK, an authentication screen illustrated in FIG. 21 is displayed. The authentication screen illustrated in FIG. 21 is a screen for performing authentication with one of a coin rack and a key counter.

As described above, the CCS 39 generates a screen based on an instruction from the application. However, the application does not request an authentication screen to be generated if authentication has been completed. For instance, it is assumed that the relationship between the function and authentication is as shown in FIG. 13 and that the authentication state is as shown in FIG. 22.

The table of FIG. 22 shows the authentication states of various types of authentication, indicating, with respect to each authentication type, whether the user is authenticated with the authentication type. The information shown in this table is retained by the CCS 39 and reported to the application.

The application determines, based on this table, whether to display a screen. In this case, the table of FIG. 22 indicates that the user is authenticated with AUTHENTICATION METHOD 1 and AUTHENTICATION METHOD 4. Accordingly, execution of the functions other than monochrome printing shown in FIG. 13 requires no authentication. This is indicated by FIG. 23 showing functions and authentication states required for execution of the functions. Based on the table shown in FIG. 23, the application determines whether to instruct the CCS 39 to generate a screen.

Next, a description is given of a usable function. In principle, the authentication setting reported by the CCS 39 is a setting for reporting lack of authentication. In the case of role-based access (a user logon), use of the MFP 1 may be restricted because of the function restriction attributes of individual users although the authentication state is OK.

In executing a restricted function, the MFP 1 according to this embodiment, which is a system that only displays the fact that the function is restricted and requires no new authentication at the time of having an authentication result, is designed so that each application receiving the authentication result displays a screen.

Accordingly, at the time of reporting the authentication result (AUTHENTICATION OK/NG), the CCS 39 also reports a usable function, which is described below using a specific example.

First, a description is given, with reference to FIG. 24, of a system setting. The system setting is the basic setting of authentication in the MFP 1. A table showing a system setting shown in FIG. 24 indicates that authentication is performed with a local address book for a personal authentication setting, that authentication is performed with a key card for a full-color function (FULL COLOR), that authentication is performed with a key card or key counter for a monochrome function (MONOCHROME), and that no setting is provided for a two-color function (TWO COLOR) and a single-color function (SINGLE COLOR).

FIG. 25 shows an authentication setting in this case. FIG. 25 shows functions or operations and authentication methods corresponding thereto. For instance, FIG. 25 shows that the authentication method of full-color printing is AUTHENTICATION METHOD 1, and that the authentication method of a panel-using job operation is AUTHENTICATION METHOD 3.

Thus, the authentication methods are reported to the application not by their specific contents but by their respective numbers. Accordingly, the CCS 39 manages the details of the specific contents of the authentication methods. FIG. 26 shows the details of the specific contents of authentication methods managed by the CCS 39.

FIG. 26 shows authentication methods, the contents of authentication corresponding to the authentication methods, and character strings to be displayed on the authentication screen. For instance, FIG. 26 shows that the contents of authentication of AUTHENTICATION METHOD 2 are a key counter, and that a character string to be displayed on the authentication screen is SET KEY COUNTER. Likewise, FIG. 26 shows the contents of authentication and a character string to be displayed with respect to the other authentication methods.

Next, a description is given of authentication in which an individual is identified. In the authentication in which an individual is identified, an authenticated user may have limited access to functions. FIG. 27 shows the contents of a setting for a user who has logged on (a logged-on user). The contents of the setting include a user setting with respect to the items of user attribute, functions such as a color function, and authorization to execute a copy application.

In the case of FIG. 24, the user attribute is GENERAL (a general user), the color function and the two-color function are NO (unusable), the monochrome function and the single-color function are YES (usable), and the authorization to execute a copy application is YES (authorized).

Thus, when a user logs on, the CCS 30 sets the authentication state of AUTHENTICATION METHOD 3, whose authentication method is a logon, to OK, and reports the usable functions of the logged-on user separately from the authentication setting notice.

FIG. 28 shows the items reported at this point. The usable functions shown in FIG. 28 are based on the user setting described with reference to FIG. 27. For instance, the full-color function is NO (unusable), and the copy application function is YES (usable).

Based on the usable functions, the authentication setting, and the authentication state, the application determines which function is executable. FIG. 29 shows the determination results. According to FIG. 29, the single-color function and the copy application function are executable. In this determination, a function is determined to be non-executable if the authentication state is NG or the function is unusable. Accordingly, for instance, the monochrome function, which is usable, is determined to be non-executable because the state of authentication with AUTHENTICATION METHOD 1 or AUTHENTICATION METHOD 2 is not OK.

If a user makes an attempt to execute a non-executable function, screen display is performed in accordance with the following rule at the time of the execution.

First, in the case of newly requiring authentication, the application transmits a request to display an authentication screen to the CCS 39. If the usage of a function is restricted for a reason other than authentication, the application itself displays the fact that the function is restricted. This display is performed by, for instance, reducing button brightness by half or displaying a message to that effect. The display manner is determined by the application.

A function usage restriction is issued as a parameter when the authentication state becomes OK with an authentication method. When different function usage restrictions are issued in multiple authentication methods, the application determines whether the function is usable based on the AND operation result of the function usage restrictions. Since the AND condition is employed, the function is determined to be unusable if any of the function usage restrictions indicates that the function is unusable.

Next, a description is given of notifying the application of a charging method. Based on the SP/UP setting, the CCS 39 notifies each application which charging method setting (charging setting) is required to execute a function. For instance, the CCS 39 notifies the application that charging to a key counter is necessary for monochrome copy printing or that charging to a key counter and a user code is necessary for color copy printing.

This charging setting notification is performed as follows. As described above, at the time of activation of the system, the application is registered with the CCS 39, and the CCS 39 notifies the registered application of a function-by-function charging (method) setting.

A description is given, with reference to FIG. 30, of an example of this charging setting reported to the application. The table of FIG. 30 shows functions requiring charging and their respective charging methods. For instance, FIG. 30 shows that the charging method is AUTHENTICATION METHOD 1 OR AUTHENTICATION METHOD 2 in the case of the full-color function (FULL COLOR). In the case of FIG. 27, the charging method is indicated by an authentication method. This is because the authentication method specified as a charging method is part of the method reported in the authentication setting in this case, and because authentication is automatically required for execution of charging in this case since authentication with a corresponding charging device should always be completed in order to execute charging. If the charging method and the authentication method are different, another name such as CHARGING METHOD 1 is used.

Thus, in order to make the type of a charging device transparent to the application, a specific authentication method name such as a user code or key counter is not presented, but the charging method is indicated by an abstract name such as AUTHENTICATION METHOD 1 or AUTHENTICATION METHOD 2.

It is also possible to assign multiple authentication methods to a single function. In this case, the application employs, as a charging method, one of the authentication methods with which the user is authenticated first. In some applications, the usage priorities of authentication devices are determined. Accordingly, in the case of such applications, the CCS 39, which abstracts authentication device types, determines the priorities and notifies the applications of the determined priorities.

When the SP/UP setting is changed (updated), the CCS 39 notifies each registered application of a charging setting corresponding to the updated SP/UP setting.

Figure 31:
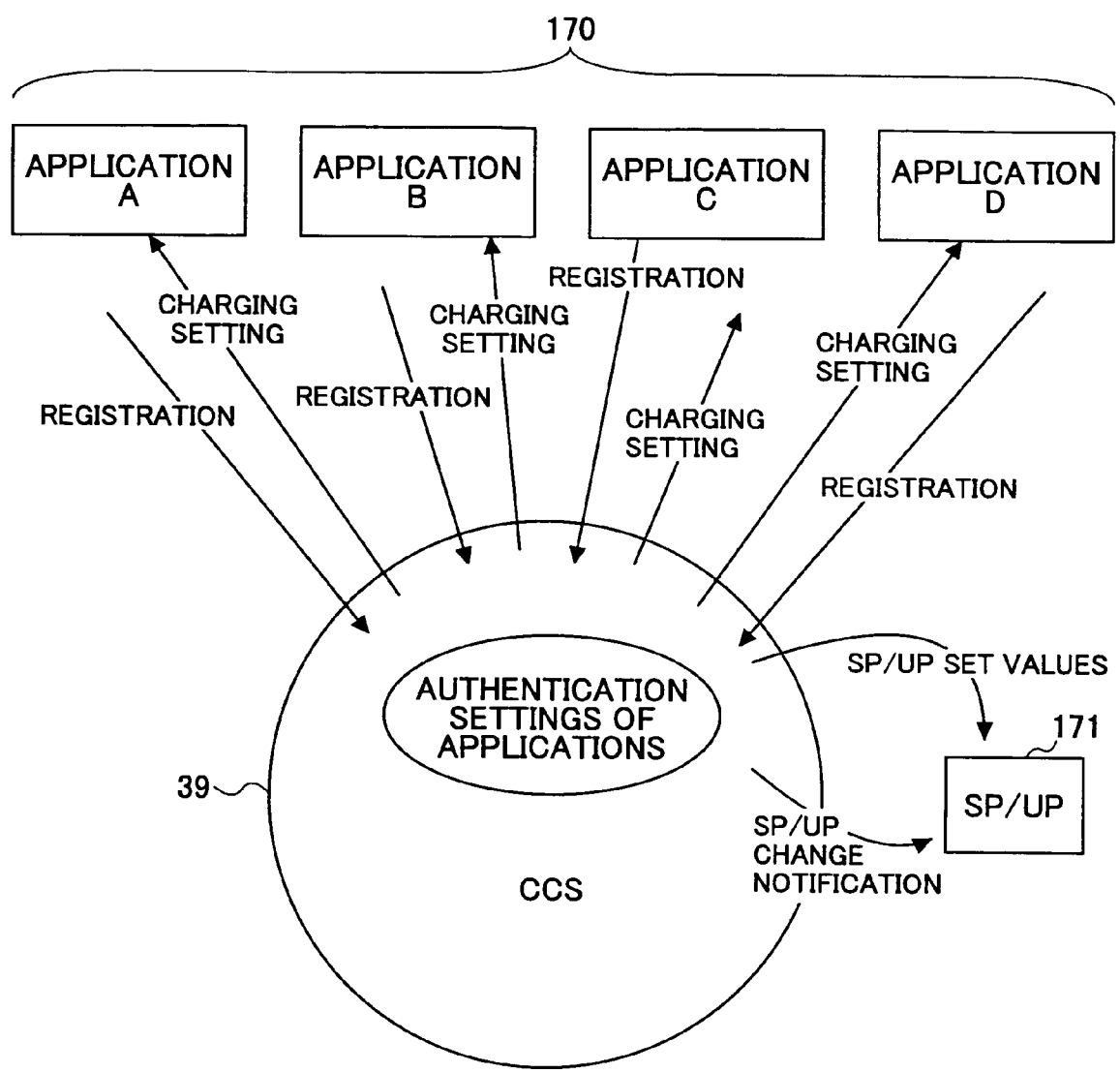
FIG. 31 is a diagram illustrating how the charging setting is provided according to the embodiment of the present invention.

FIG. 31 is a diagram illustrating the above-described application registration and charge setting provision. When each application 170 is registered with the CCS 39, the CCS 39 notifies each application 170 of a charging setting based on the SP/UP set values 171.

Figure 32:
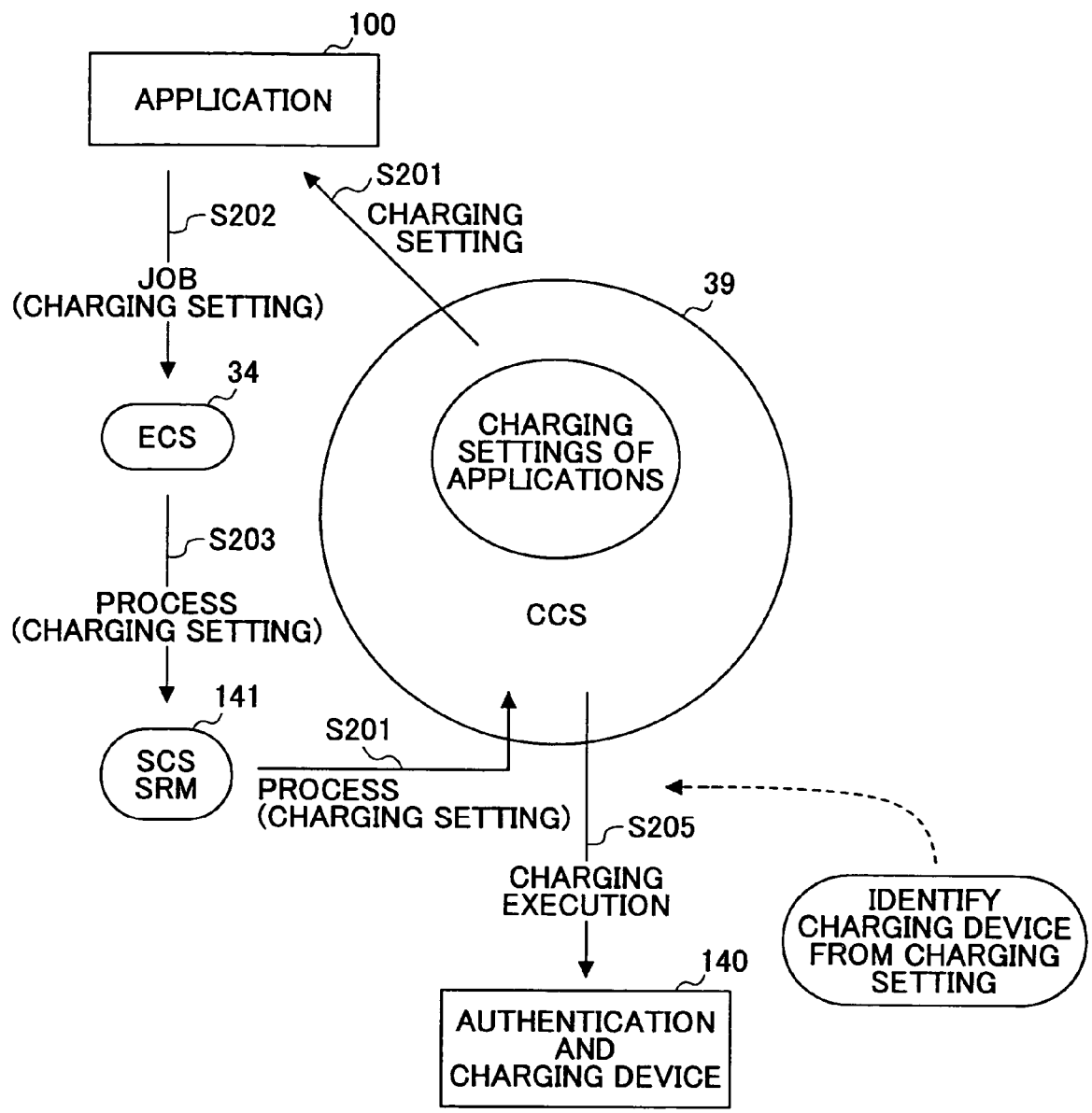
FIG. 32 is a diagram illustrating the operation of performing counting with respect to a charging device according to the embodiment of the present invention.

Next, a description is given, with reference to FIG. 32, of the operation of performing counting with respect to a charging device. In step S201 of FIG. 32, the CCS 39 notifies the application 100 of the charging method of each mode. In step S202, the application 100 determines the charging method, and passes a job to the ECS 34.

If it is possible to use multiple authentication methods as charging methods, the application 100 or the ECS 34 gives an instruction to execute charging with one of the authentication methods whose authentication is completed first. In step S203, the ECS 34 passes a process to the SCS/SRM 141. A count instruction request is added to the process information of the process. In step S204, the SCS/SRM 141 passes the process to the CCS 39. In step S205, the CCS 39 performs counting with appropriate timing with a charging method added to the process information.

Figures 33, 34:
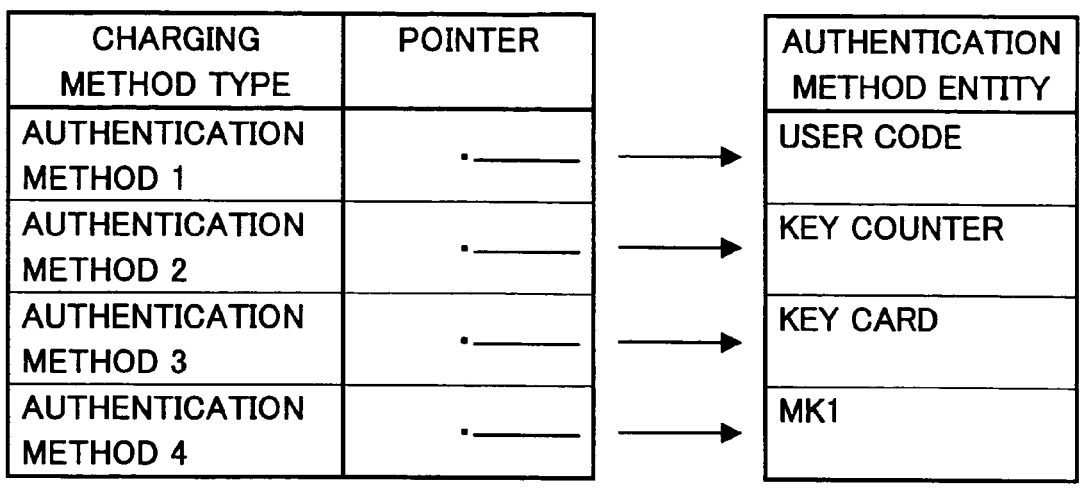
FIG. 33 shows an authentication method correlation table according to the embodiment of the present invention.
FIG. 34 is a diagram showing a usage registration list according to the embodiment of the present invention.

If charging to AUTHENTICATION METHOD 1 is set with the application 100 being notified of this charging setting, the CCS 39, which internally retains an authentication method correlation table shown in FIG. 33, executes charging to AUTHENTICATION METHOD 1.

The authentication method correlation table shown in FIG. 33 correlates charging method types with their corresponding entities. By this authentication method correlation table, an authentication method entity corresponding to an authentication method can be obtained by referring to an address indicated by a pointer corresponding to the authentication method in the authentication method correlation table.

A description is given of the internal data of the CCS 39 and their management. FIG. 34 shows a usage registration list. The usage registration list, which is a list of usage registration information composed of a requester, a client ID, and necessary application information, retains information on registrants.

In the usage registration information, the requestor is an application requesting its registration, the client ID is an ID assigned to the requester, and the necessary application information is application information required by the requester.

This usage registration information is created when the application is registered. FIG. 34 shows the case where the requestors are the copy, printer, and scanner applications.

Next, a description is given, with reference to FIGS. 35A and 35B, of an authentication and charging setting list. The authentication and charging setting list, which is a list of authentication and charging setting information composed of a function name and a method name, correlates the function name with the corresponding authentication method required for the function. The authentication and charging setting list is created based on an initial setting and an SP setting, and is updated when power is turned on or the contents of a setting are changed.

FIG. 35A shows an authentication and charging setting list for copying. FIG. 35B shows an authentication and charging setting list for printing. For instance, as shown in the method name of the authentication and charging setting list for copying, multiple method names can be specified. Further, the authentication and charging setting list is correlated with the requester of the usage registration list of FIG. 34.

Next, a description is given, with reference to FIG. 36, of a method table. The method table, which is composed of a method name and a real device (REAL DEVICE 1 and REAL DEVICE 2), correlates an authentication method with a corresponding entity. For instance, the table of FIG. 36 shows that REAL DEVICE 1 of AUTHENTICATION METHOD 2 is a key counter and REAL DEVICE 2 of AUTHENTICATION METHOD 2 is a user code. This method table is also created based on an initial setting and an SP setting and updated when power is turned on or the contents of a setting are changed. The method table is correlated with the method name of the authentication and charging setting list (FIG. 35A or 35B).

Next, a description is given, with reference to FIG. 37, of a real device management list. The real device management list, which is a list of real device management information composed of a real device name, a CCM name, authentication type information, and a state, shows real-device-related information. Each real device name may have multiple values (states) set in the STATE column of the real device management list as in the case of a key card.

The real device management list is created based on an initial setting and an SP setting, and is updated when power is turned on or the contents of a setting are changed. Further, the real device management list may also be changed by a state notice from a CCM. The real device management information is correlated with REAL DEVICE 1 and REAL DEVICE 2 of the method table of FIG. 36.

Of the above-described data, the lists other than the authentication method correlation table and the method table are data that are created when needed. Accordingly, reserving memory every time a list is created consumes fewer resources. In this case, the data may be managed by chaining the reserved memory areas.

Figure 38:
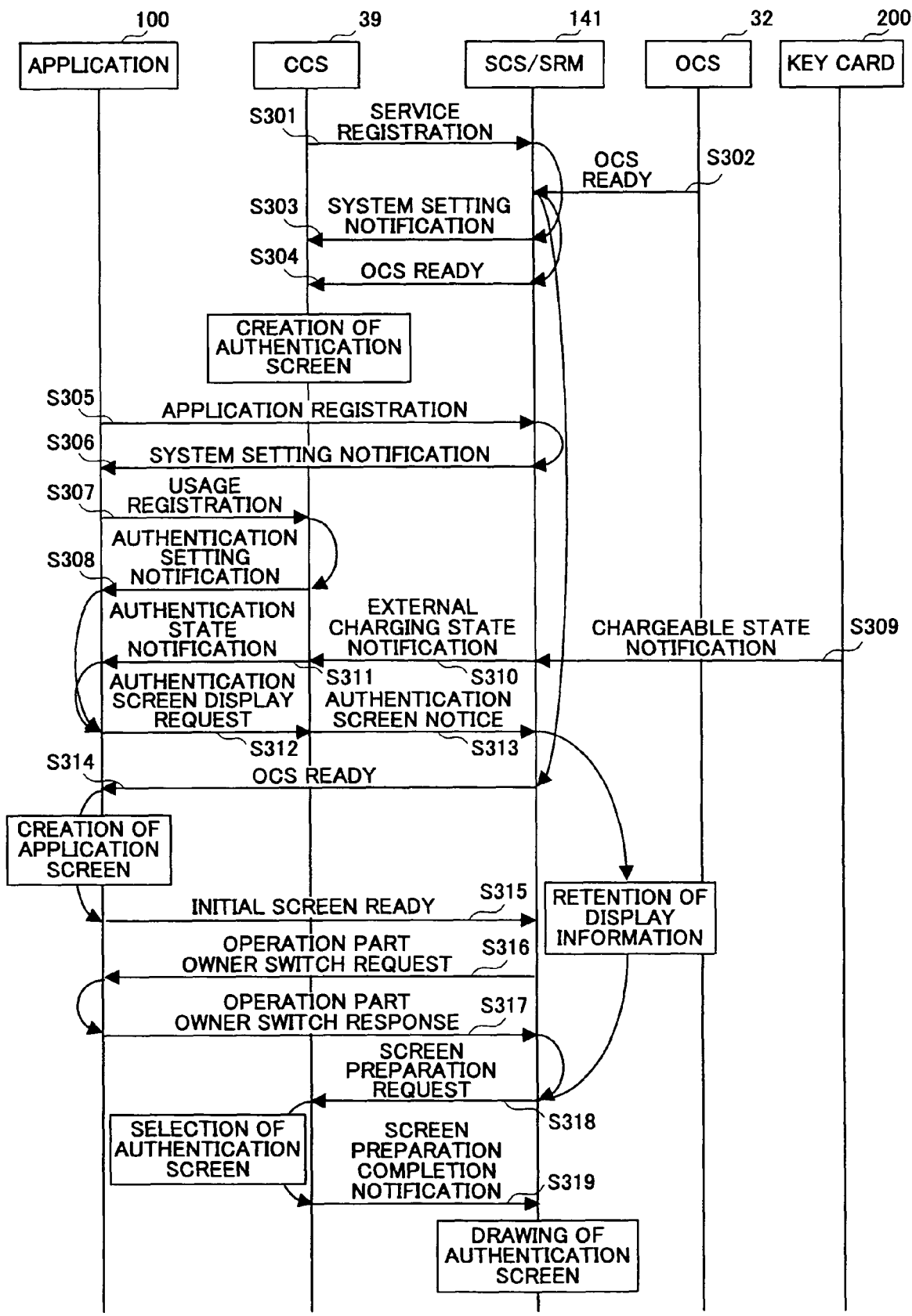
FIG. 38 is a sequence diagram illustrating the operation from service registration by the CCS to display of an authentication screen according to the embodiment of the present invention.

Next, a description is given, with reference to the sequence diagram of FIG. 38, of the operation from service registration by the CCS 39 to display of an authentication screen.

In step S301 of FIG. 38, the CCS 39 is activated to make service registration with the SCS/SRM 141. After the registration, in step S303, the CCS 39 receives a system setting notice. At this point, if the OCS 32 is ready, in step S302, the OCS 32 notifies the SCS/SRM 141 that the OCS 32 is ready (OCS READY). In step S304, the OCS 39 is notified that the OCS 32 is ready (OCS READY) by the SCS/SRM 141.

A root handle for creating a system screen is set in OCS READY. When the CCS 39 is notified of OCS READY, the CCS 39 creates windows and items used in the authentication screen. Most of the windows and items are created at this time.

When the application 100 is activated, in step S305, the application 100 makes application registration with the SCS/SRM 141. In step S306, the SCS/SRM 141 transmits a system setting notice to the application 100.

In step S307, the application 100 makes usage registration with the CCS 39. In step S308, the CCS 39 transmits an authentication setting notice to the registered application 100, notifying the registered application 100 of an authentication setting.

In step S309, a key card 200 transmits a chargeable state notice to the SCS/SRM 141. In step S310, the SCS/SRM 141 transmits the chargeable state notice to the CCS 39 as an external charging state. In step S311, the CCS 39 transmits an authentication state notice to the application 100, notifying the application 100 of an authentication state.

Being notified of the authentication setting and the authentication state, the application 100 determines a function to be restricted with the authentication state of the key card 200, and in step S312, the application 100 transmits an authentication screen display request to the CCS 39.

Receiving the authentication screen display request, the CCS 39 retains detailed restriction information, and in step S313, the CCS 39 notifies the SCS/SRM 141 of the requesting application 100 and display information relating to display of DISPLAY ON/OFF (an authentication screen notice). The SCS/SRM 141 retains as much display information as the number of applications. The CCS 39 retains the detailed restriction information.

In step S314, the application 100 receives OCS READY, and creates an application screen. In step S315, the application 100 notifies the SCS/SRM 141 that an initial screen is ready (INITIAL SCREEN READY). In step S316, the SCS/SRM 141 transmits an operation part owner switch request to the application 100. In step S317, the application 100 transmits an operation part owner switch response to the SCS/SRM 141.

Immediately after completion of the operation part owner switch response, in step S318, the SCS/SRM 141 transmits a screen preparation request to the CCS 39, using the display information of the application 100 retained by the SCS/SRM 141. In response to this request, the CCS 39 selects a window to be displayed on the authentication screen, selects an item to be displayed, and changes the display attributes of the window and the item to OPEN or CLOSE.

The CCS 39 does not perform drawing (PAINT), and in step S319, the CCS 39 transmits to the SCS/SRM 141 a screen preparation completion notice in which the window handle of the window desired to be displayed is set. If a window handle is set, the SCS/SRM 141 performs drawing (PAINT). If a window handle is not set, the SCS/SRM 141 performs no operation. In this case, it is assumed that the window handle is set. Accordingly, drawing is performed on the SCS side.

Figure 39:
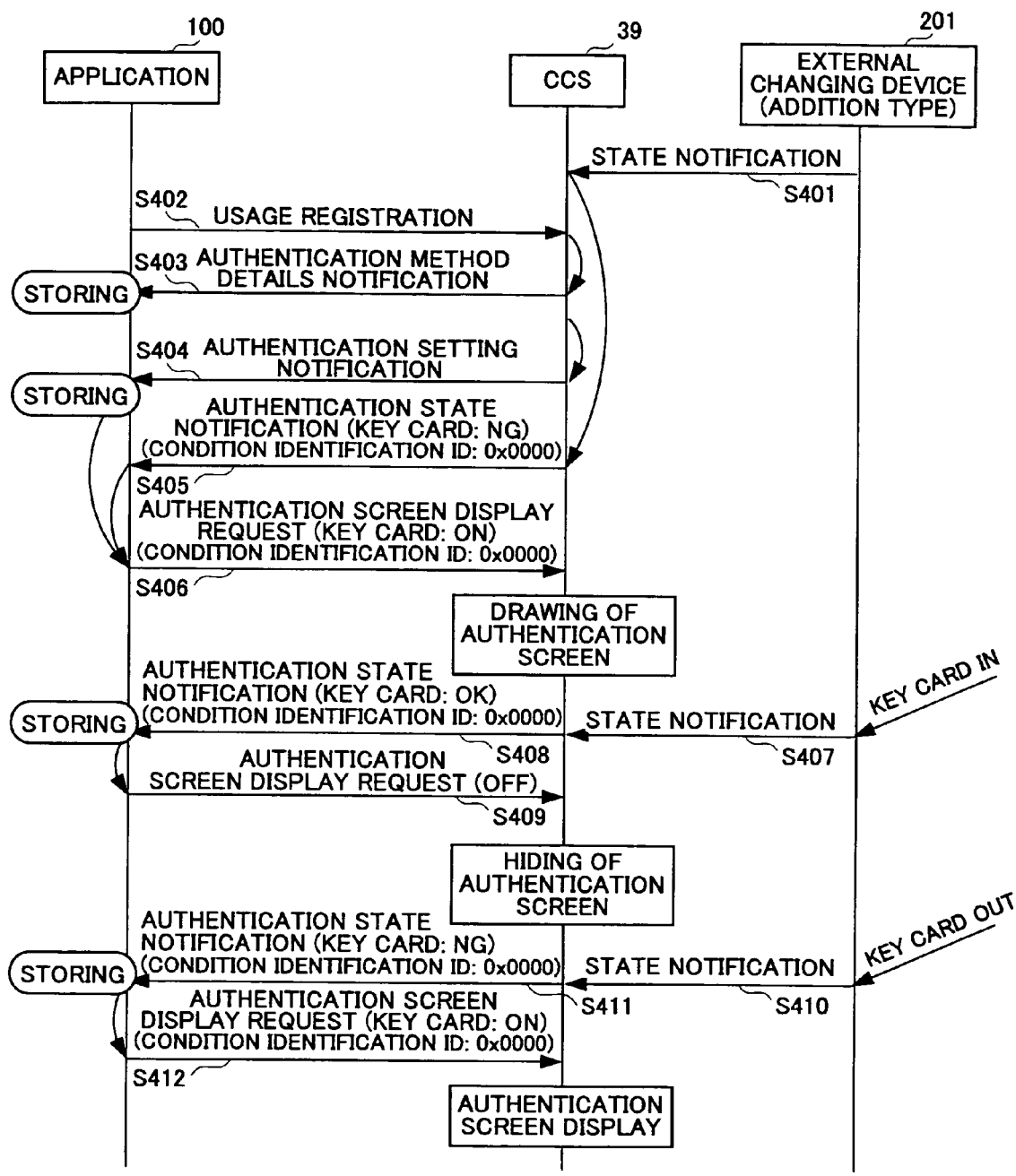
FIG. 39 is a sequence diagram illustrating the basic operation of authentication in the case of using an addition-type external charging device according to the embodiment of the present invention.

Next, a description is given, with reference to FIG. 39, of the basic operation of authentication in the case of using an addition-type external charging device. The term "addition-type" refers to a method of adding up an amount of money in proportion to use. A key card is an example of this type of external charging device.

In step S401 of FIG. 39, an external charging device 201 transmits a state notice to the CCS 39. In step S402, the application 100 makes usage registration with the CCS 39. At this point, the application 100 specifies setting information to be used for authentication, and has the setting information registered with the CCS 39.

In step S403, the CCS 39 transmits an authentication method details notice to the application 100. This notification is performed as many times as the number of authentication methods that may be used. A description is given below of the contents of the authentication method details notice. Based on the contents of the authentication method details notice, the application 100 stores what control each authentication method should perform.

Next, in step S404, the CCS 39 transmits an authentication setting notice to the application 100. This authentication setting notice is also transmitted as many times as the number of functions requiring authentication.

In step S405, the CCS 39 transmits an authentication state notice to the application 100 based on a state notice transmitted from the external charging device 201. The contents of this notification are KEY CARD NG because a key card has not been inserted in the external charging device 201. Here, KEY CARD NG is used in this description. Actually, however, the name of KEY CARD is not used, and the name of AUTHENTICATION METHOD X is used. Further, a condition identification ID is an ID assigned to a condition in order to set conditions in the authentication method, and is not determined by the contents of a condition. If the authentication method does not set a condition, the condition identification ID is 0x0000 indicating nullity.

In step S406, the application 100 transmits an authentication screen display request to the CCS 39. The application 100 determines the authentication method from the authentication setting notice and the authentication state notice. In this case, the state of the authentication method is NG. Accordingly, the application 100 requests the CCS 39 to display an authentication screen by the notification of step S406.

The CCS 39 displays an authentication screen. Thereafter, in step S407, the CCS 39 receives a state notice from the external charging device 201, being notified of insertion of a key card. As a result, in step S408, the CCS 39 transmits an authentication state notice to the application 100, notifying the application 100 of insertion of a key card.

In step S409, the application 100 transmits an authentication screen display request to the CCS 39 in order to end display of the authentication screen displayed after step S406. The CCS 39 hides the authentication screen.

When the key card is extracted, in step S410, the external charging device 201 transmits a state notice to the CCS 39, notifying the CCS 39 of extraction of the key card. In step S411, the CCS 39 transmits an authentication state notice to the application 100, notifying the application 100 of an authentication failure (AUTHENTICATION NG) due to extraction of the key card. In step S412, the application 100 transmits an authentication screen display request to the CCS 39 in order to cause the CCS 39 to display the authentication screen again. The CCS 39 displays the authentication screen again.

A description is given of the contents of the above-described authentication method details notice. The authentication method details notice reports the following seven types of parameters.

The first type of parameter indicates whether to reset a mode in execution at the time of occurrence of an authentication failure (AUTHENTICATION NG). The second type of parameter indicates whether to stop reading, facsimile printing, and facsimile transmission at the time of occurrence of an authentication failure (AUTHENTICATION NG). The third type of parameter indicates whether it is possible to obtain authentication for each color mode, each paper size, and each user.

The fourth type of parameter indicates whether it is possible for a user to specify the third condition on the authentication screen. The fifth type of parameter indicates whether it is possible to use obtained authentication for another operation. For instance, a user code can be used for the job of the next operation unless the user code is cleared, once a user is identified with the user code.

The sixth type of parameter indicates timing for canceling obtained authentication, which timing may be, for instance, a time to shift to power saving, a time of entrance into an initial setting, and a time after starting execution of a function. The seventh type of parameter indicates whether the authentication method allows parallel execution of reading and printing. This type of parameter is provided in order to support a charging device, such as a coin rack, which requires reading and printing to be executed in synchronization with each other, being prevented from advancing execution of only reading in the case of occurrence of a situation where only printing is performable at the time of execution of copying.

Figure 40:
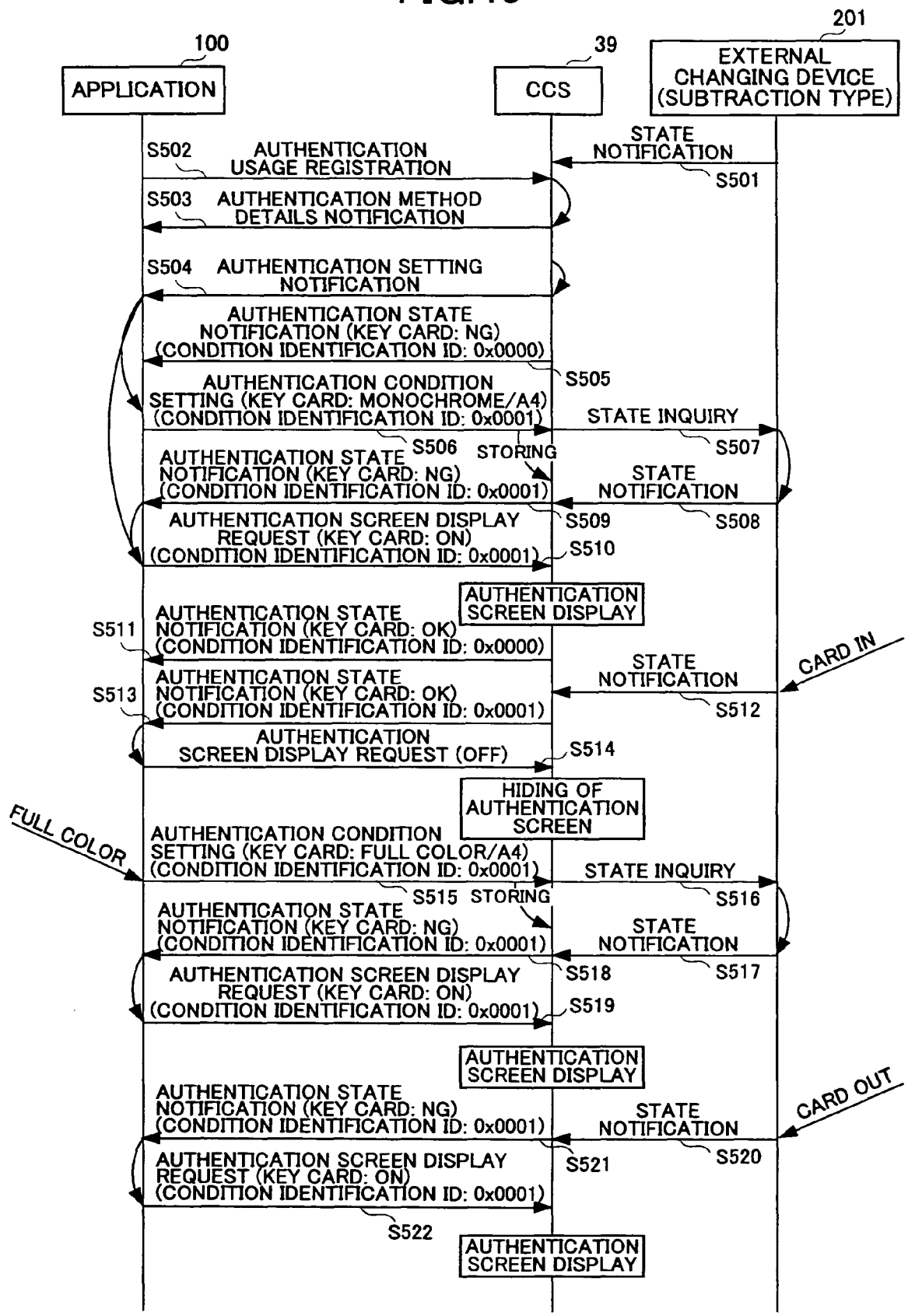
FIG. 40 is a sequence diagram illustrating the basic operation of authentication in the case of using a subtraction-type external charging device according to the embodiment of the present invention.

Next, a description is given, with reference to FIG. 40, of the basic operation of authentication in the case of using a subtraction-type external charging device. The term "subtraction-type" refers to a method of subtracting an amount of money from a predetermined amount of money in proportion to use. A coin rack is an example of this type of external charging device. In this case, unlike in the case of the addition-type external charging device, processing such as determining whether it is possible to subtract an amount of money is required, thus resulting in an increase in processing.

In step S501 of FIG. 40, the external charging device 201 transmits a state notice to the CCS 39. In step S502, the application 100 makes usage registration with the CCS 39. At this point, the application 100 specifies setting information used for notification, and has the setting information registered with the CCS 39.

In step S503, the CCS 39 transmits an authentication method details notice to the application 100. This notification is performed as many times as the number of authentication methods that may be used. Based on the contents of the authentication method details notice, the application 100 stores what control each authentication method should perform.

Next, in step S504, the CCS 39 transmits an authentication setting notice to the application 100. This authentication setting notice is also transmitted as many times as the number of functions requiring authentication.

In step S505, the CCS 39 transmits an authentication state notice to the application 100 based on a state notice transmitted from the external charging device 201. The contents of this notification are KEY CARD NG because a key card has not been inserted in the external charging device 201. Here, KEY CARD NG is used in this description. Actually, however, the name of KEY CARD is not used as in the above-described case.

Next, in step S506, the application 100 notifies the CCS 39 of an authentication condition setting. An authentication condition in this case is monochrome and A4, and its condition identification ID is 0x0001. The CCS 39 is notified of the authentication condition because the subtraction-type external charging device requires the setting of the authentication condition. The CCS 39 stores the authentication condition of which the CCS 39 has been notified. In step S507, the CCS 39 transmits a state inquiry to the external charging device 201. In step S508, the external charging device 201 transmits a state notice to the CCS 39. In step S509, the CCS 39 notifies the application 100 of the state of the external charging device 201 of which the CCS 39 has been notified.

Being notified of the state of the external charging device 201, in step S510, the application 100 transmits an authentication screen display request to the CCS 39. Receiving the request, the CCS 39 displays an authentication screen, and in step S511, the CCS 39 transmits an authentication state notice indicating KEY CARD OK to the application 100. At this point, the condition identification ID is 0x0000.

As a result of insertion of a key card, in step S512, the external charging device 201 transmits a state notice to the CCS 39. In step S513, the CCS 39 transmits an authentication state notice to the application 100. At this point, the condition identification ID is 0x0001. As a result, the condition is satisfied. Accordingly, in step S514, the application 100 transmits an authentication screen display request to the CCS 39. Receiving the request, the CCS 39 hides the authentication screen.

Next, it is assumed that the condition of monochrome is changed to full color. In this case, in step S515, the application 100 notifies the CCS 39 of an authentication condition setting in order to set the condition of full color and A4. In this case, the condition identification ID is 0x0001 as in step S506. If, for instance, a different ID of 0x0002 is used instead of 0x0001, notification is also performed when the condition of 0x0001 assigned to monochrome and A4 is satisfied.

Being notified of the authentication condition setting, the CCS 39 stores the authentication condition, and in step S516, the CCS 39 transmits a state inquiry to the external charging device 201. In step S517, the external charging device 201 notifies the CCS 39 of the state of the external charging device 201. In step S518, based on the state of which the CCS 39 has been notified by the external charging device 201, the CCS 39 transmits an authentication state notice to the application 100. In this case, the contents of the notice are KEY CARD NG.

Then, in step S519, the application 100 transmits an authentication screen display request to the CCS 39. Receiving the request, the CCS 39 displays an authentication screen. Here, the key card is extracted. Accordingly, in step S520, the external charging device 201 transmits a state notice to the CCS 39. In step S521, the CCS 39 notifies the application 100 of KEY CARD NG as an authentication state notice. Then, the application 100 retransmits the authentication screen display request to the CCS 39, and the CCS 39 displays the authentication screen.

Figure 41:
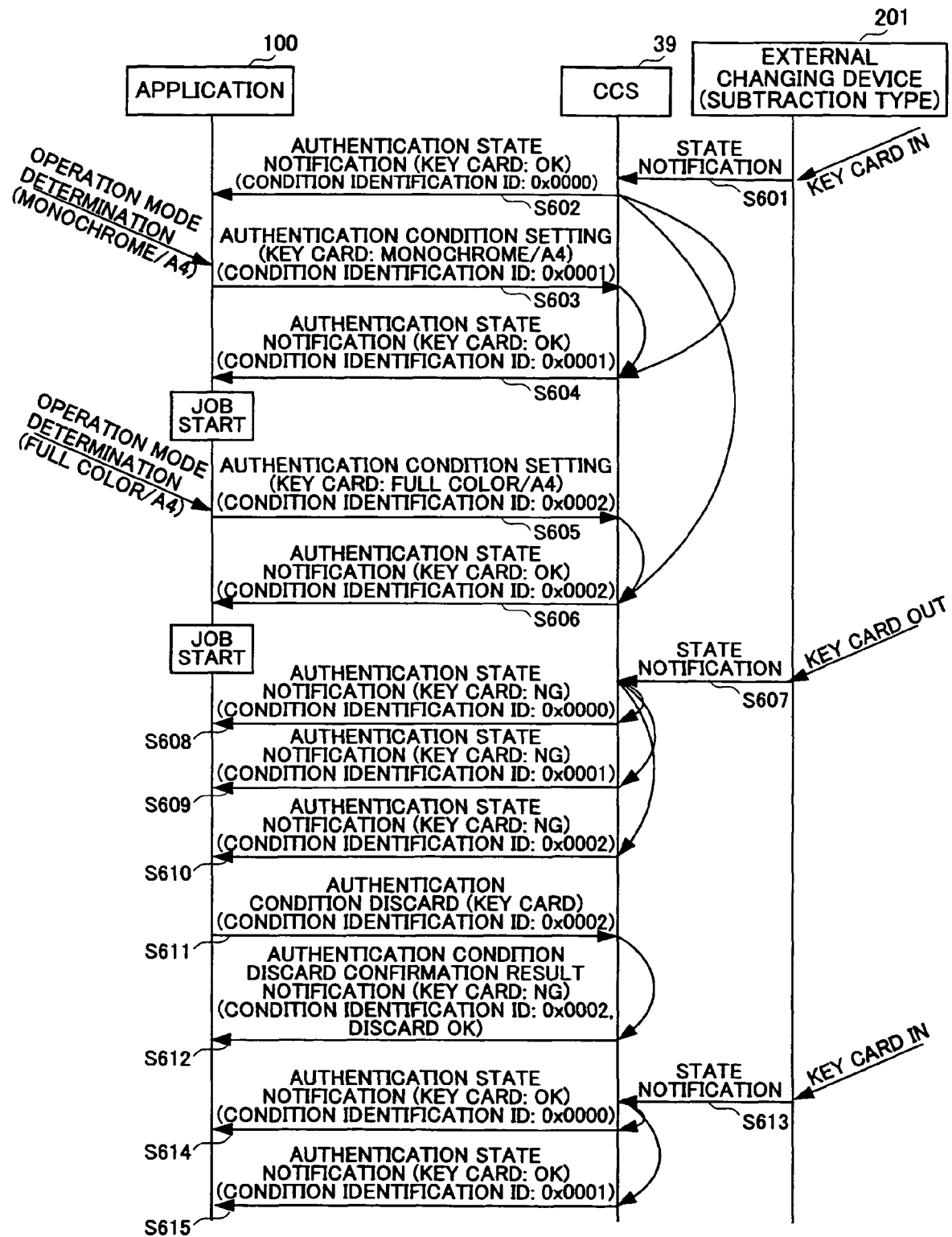
FIG. 41 is a sequence diagram illustrating the basic operation of authentication in a remote operation according to the embodiment of the present invention.

Next, a description is given, with reference to FIG. 41, of the basic operation of authentication in a remote operation. The remote operation is, for instance, an operation from a PC through a network.

In step S601 of FIG. 41, the external charging device 201 having a key card inserted therein notifies the CCS 39 of the state of the external charging device 201. When it is determined that the operation mode is monochrome and A4, in step S603, the application 100 notifies the CCS 39 of an authentication condition setting. The authentication condition at this point is monochrome and A4. In response to this, in step S604, the CCS 39 transmits an authentication state notice indicating an authentication success (AUTHENTICATION OK) to the application 100.

Being notified of AUTHENTICATION OK, the application 100 starts a job. When it is determined that the operation mode is full color and A4, in step S605, the application 100 notifies the CCS 39 of an authentication condition setting. This time, the authentication condition is full color and A4, and the condition identification ID is 0x0002. In response to this, in step S606, the CCS 39 transmits an authentication state notice indicating an authentication success (AUTHENTICATION OK) to the application 100.

Being notified of AUTHENTICATION OK, the application 100 starts a job. When the key card is extracted, in step S607, the external charging device 201 transmits a state notice to the CCS 39. In step S608, the CCS 39 transmits an authentication state notice indicating AUTHENTICATION NG to the application 100. The condition identification ID at this point is 0x0000. Further, in step S609, the CCS 39 transmits an authentication state notice indicating AUTHENTICATION NG to the application 100. The condition identification ID at this point is 0x0001. Further, in step S610, the CCS 39 transmits an authentication state notice indicating AUTHENTICATION NG to the application 100. The condition identification ID at this point is 0x0002.

Thus, as many authentication state notices as the number of condition identification IDs are transmitted. Receiving these notices, in step S611, the application 100 transmits an authentication condition discard notice for discarding the condition identification ID to the CCS 39. The condition identification ID to be discarded at this point is 0x0002. In response to this, in step S612, the CCS 39 notifies the application 100 of an authentication condition discard confirmation result to the application 100, notifying the application 100 of DISCARD OK indicating that the condition identification ID has been discarded.

When the key card is reinserted, in step S613, the external charging device 201 transmits a state notice to the CCS 39. In step S614, the CCS 39 transmits an authentication state notice indicating an authentication success (AUTHENTICATION OK) to the application 100. The condition identification ID at this point is 0x0000. Further, in step S616, the CCS 39 transmits an authentication state notice indicating an authentication success (AUTHENTICATION OK) to the application 100. The condition identification ID at this point is 0x0001.

The present invention is not limited to the specifically disclosed embodiment, and variations and modifications may be made without departing from the scope of the present invention.

The present application is based on Japanese Priority Patent Application No. 2004-156239, filed on May 26, 2004, the entire contents of which are hereby incorporated by reference.

What is claimed is:

1. An image forming apparatus having a hardware resource used in image forming processing and an application executing the image forming processing, the image forming apparatus performing authentication relating to the execution of the image forming processing, the image forming apparatus comprising:

a character string display part configured to display a character string prompting the authentication needed to perform a type of the image forming processing, the character string excluding the type of the image forming processing; and a type character string display part configured to display the type of the image forming processing on a same display as the character string display part, the type of the image forming processing having a usage restriction which is indicated in a notification, by the application executing the image forming processing, of a usage restriction for the type of the image forming processing; and a system control part configured to independently control the character string display part and the type character string display part, the system control part generating the same character string even when generating a different type character string based on a newly available type of the image forming processing or an indication in the notification of a different usage restriction for the type of the image forming processing.

2. The image forming apparatus as claimed in claim 1, further comprising:

an authentication information input part configured to display an input object in which authentication information relating to the authentication is input.

3. The image forming apparatus as claimed in claim 2, wherein when a plurality of authentication types are available for the authentication, the authentication information input part displays a corresponding input object for each of the plurality of authentication types.

4. The image forming apparatus as claimed in claim 3, wherein each of the corresponding input objects is a button-type object in which an authentication name of a corresponding one of the authentication types is displayed.

5. The image forming apparatus as claimed in claim 4, wherein the authentication information input part displays the button-type object based on notification from the application executing the image forming processing.

6. The image forming apparatus as claimed in claim 4, wherein the authentication name displayed in the button-type object is reported from the application executing the image forming processing.

7. The image forming apparatus as claimed in claim 4, wherein the authentication information input part notifies the application of an event corresponding to the button-type object when an input is made to the button-type object.

8. The image forming apparatus as claimed in claim 3, wherein the character string displayed by the character string display part prompts selection of one of the authentication types displayed by the authentication information input part.

9. The image forming apparatus as claimed in claim 2, wherein the input object is an input-column-type object in which a character string relating to the authentication is input.

10. The image forming apparatus as claimed in claim 9, wherein the character string relating to the authentication includes a user code identifying a user.

11. The image forming apparatus as claimed in claim 9, wherein the character string relating to the authentication includes a username and a password.

12. The image forming apparatus as claimed in claim 1, wherein the type character string display part displays a character string reported from the application executing the image forming processing.

13. The image forming apparatus as claimed in claim 1, wherein in a case of performing the authentication with a combination of a plurality of authentication types, the character string display part and the type character string display part successively perform display operations corresponding to the authentication types.

14. An authentication and charging method in an image forming apparatus having a hardware resource used in image forming processing and an application executing the image forming processing, the image forming apparatus performing authentication relating to the execution of the image forming processing, the authentication and charging method comprising the steps of:

displaying a character string prompting the authentication needed to perform a type of the image forming processing, the character string excluding the type of the image forming processing; and displaying the type of the image forming processing on a same display displaying the character string, the type of the image forming processing having a usage restriction which is indicated in a notification, by the application executing the image forming processing; and independently controlling the displaying the character string and the displaying the type of the image forming processing steps to display the same character string even when displaying a different type of the image forming processing.

15. The authentication and charging method as claimed in claim 14, further comprising the step of:

displaying an input object in which authentication information relating to the authentication is input.

16. The authentication and charging method as claimed in claim 15, wherein when a plurality of authentication types are available for the authentication, corresponding input objects are displayed for each authentication type in the displaying the input object step.

17. The authentication and charging method as claimed in claim 16, wherein each of the input objects is a button-type object in which an authentication name of a corresponding one of the authentication types is displayed.

18. The authentication and charging method as claimed in claim 17, wherein the button-type object is displayed based on notification from the application executing the image forming processing in the displaying the input object step.

19. The authentication and charging method as claimed in claim 17, wherein the authentication name displayed in the button-type object is reported from the application executing the image forming processing.

20. The authentication and charging method as claimed in claim 17, wherein in the displaying the input object step, the application is notified of an event corresponding to the button-type object when an input is made to the button-type object.

21. The authentication and charging method as claimed in claim 16, wherein the character string displayed in said step (a) prompts selection of one of the authentication types displayed in the displaying the input object step.

22. The authentication and charging method as claimed in claim 15, wherein the input object is an input-column-type object in which a character string relating to the authentication is input.

23. The authentication and charging method as claimed in claim 22, wherein the character string relating to the authentication includes a user code identifying a user.

24. The authentication and charging method as claimed in claim 22, wherein the character string relating to the authentication includes a username and a password.

25. The authentication and charging method as claimed in claim 14, wherein a character string reported from the application executing the image forming processing is displayed in the displaying the type of the image forming processing step.

26. The authentication and charging method as claimed in claim 14, wherein in a case of performing the authentication with a combination of a plurality of authentication types, display operations corresponding to the authentication types are successively performed in the displaying the character string step and the displaying the type of the image forming processing step.

* * * * *